United States Patent
Gay et al.

(10) Patent No.: US 8,493,520 B2
(45) Date of Patent: Jul. 23, 2013

(54) OPTICAL SYSTEM AND DISPLAY THAT CONVERTS A FLAT IMAGE TO A NON-FLAT IMAGE

(75) Inventors: Gregory Gay, Oxford (GB); Harry Garth Walton, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 702 days.

(21) Appl. No.: 12/602,335

(22) PCT Filed: May 30, 2008

(86) PCT No.: PCT/JP2008/060406
§ 371 (c)(1),
(2), (4) Date: Nov. 30, 2009

(87) PCT Pub. No.: WO2008/149961
PCT Pub. Date: Dec. 11, 2008

(65) Prior Publication Data
US 2010/0177113 A1    Jul. 15, 2010

(30) Foreign Application Priority Data
Jun. 1, 2007   (GB) .................................. 0710407.8

(51) Int. Cl.
*G02F 1/1335* (2006.01)
(52) U.S. Cl.
USPC .............. 349/15; 349/113; 349/114; 345/173
(58) Field of Classification Search
USPC .......................................... 349/15, 113–114
See application file for complete search history.

(56) References Cited

U.S. PATENT DOCUMENTS

| | | | |
|---|---|---|---|
| 5,515,122 | A | 5/1996 | Morishima et al. |
| 6,075,651 | A | 6/2000 | Hoppe |
| 6,094,242 | A | 7/2000 | Yamanaka |
| 6,266,194 | B1 | 7/2001 | Tanijiri et al. |
| 6,271,969 | B1 | 8/2001 | Mertz |
| 6,304,303 | B1 | 10/2001 | Yamanaka |
| 6,469,683 | B1 | 10/2002 | Suyama et al. |

(Continued)

FOREIGN PATENT DOCUMENTS

| | | |
|---|---|---|
| EP | 0 632 303 A1 | 1/1995 |
| EP | 0 718 645 A2 | 6/1996 |

(Continued)

OTHER PUBLICATIONS

Search Report for corresponding European Patent Application No. 08765219.4 dated Jun. 8, 2011.

(Continued)

*Primary Examiner* — Huyen Ngo
(74) *Attorney, Agent, or Firm* — Renner, Otto, Boisselle & Sklar, LLP

(57) ABSTRACT

An optical system is provided for use with a display device to convert a flat image from the display device to a non-flat image. The optical system comprises first and second spaced-apart partial reflectors, at least one of which is non-flat. The reflectors, together with polarization optics, provide a light path such that light from the display is at least partially transmitted by the first reflector, partially reflected by the second reflector, partially reflected by the first reflector and partially transmitted by the second reflector so that a viewer perceives a non-flat, for example curved, image. Light which does not follow the light path is prevented from leaving the optical system.

32 Claims, 28 Drawing Sheets

U.S. PATENT DOCUMENTS

| | | |
|---|---|---|
| 6,624,683 B1 | 9/2003 | Bedarida et al. |
| 6,727,971 B2 | 4/2004 | Lucas |
| 6,834,961 B1 | 12/2004 | Cobb et al. |
| 6,869,183 B2 * | 3/2005 | Liang et al. ............... 353/7 |
| 6,906,860 B2 | 6/2005 | Starkweather |
| 6,961,105 B2 | 11/2005 | Chang et al. |
| 7,787,064 B2 * | 8/2010 | Kwon et al. ............. 349/15 |
| 2002/0024743 A1 | 2/2002 | Endo et al. |
| 2002/0047837 A1 | 4/2002 | Suyama et al. |
| 2002/0131018 A1 | 9/2002 | Lucas |
| 2004/0014504 A1 | 1/2004 | Coates et al. |
| 2004/0160389 A1 | 8/2004 | Suyama et al. |
| 2004/0164927 A1 | 8/2004 | Suyama et al. |
| 2004/0239890 A1 | 12/2004 | Starkweather |
| 2005/0111101 A1 | 5/2005 | Dike |
| 2006/0098153 A1 | 5/2006 | Slikkerveer et al. |
| 2009/0323024 A1 | 12/2009 | Dike |
| 2011/0193814 A1 * | 8/2011 | Gay et al. ................ 345/173 |

FOREIGN PATENT DOCUMENTS

| | | |
|---|---|---|
| EP | 0 829 744 | 3/1998 |
| EP | 0 953 962 | 11/1999 |
| GB | 2 437 553 | 10/2007 |
| GB | 2449682 A | 12/2008 |
| JP | 7-84208 A | 3/1995 |
| JP | 7-230058 A | 8/1995 |
| JP | 8-327940 A | 12/1996 |
| JP | 10-74052 A | 3/1998 |
| JP | 11-153772 A | 6/1999 |
| JP | 2000-180785 A | 6/2000 |
| JP | 2004-533003 A | 10/2004 |
| JP | 2007-517241 A | 6/2007 |
| RU | 2 143 718 C1 | 12/1999 |
| WO | 94/11779 | 5/1994 |
| WO | 2003/062872 A1 | 7/2003 |
| WO | 2008/149961 A1 | 12/2008 |

OTHER PUBLICATIONS

British Search Report for corresponding Application No. GB0710407.8 dated Sep. 4, 2007.
International Search Report for corresponding Application No. PCT/JP2008/060406 mailed Sep. 9, 2008.
Pochi Yeh and Claire Gu, "Optics of Liquid Crystal Displays", Wiley Series in Pure and Applied Optics, 1999.
Ernst Lueder, "Liquid Crystal Displays: Addressing Schemes and Electro-optic Effects", Wiley-SID Series in Display Technology, 2001.
E. Hecht and A. Zajac, "Optics", Addison Wesley, Fourth Edition, 2003.
International Search Report for corresponding International Application No. PCT/JP2009/069513 mailed Mar. 2, 2010.
Written Opinion of the International Searching Authority for PCT/JP2009/069513 mailed Mar. 2, 2010.
Search Report for UK Application No. GB0821776.2 dated Mar. 27, 2009.
Jose Pons, "Emerging Actuator Technologies: A Mecha-TronicApproach", pp. 39-45, pp. 67-68, pp. 101-109, and pp. 145-159.
M. Shahinpoor et al., "Ionic Polymer-Metal Composited (IPMC) As Biomimetic Sensors and Actuators", Proceedings of SPIE's $5^{th}$ Annual International Symposium on Smart Structures and Materials, (Mar. 1-5, 1998), Pater No. 3324-27.
J.A. Pelesko et al., "Modeling MEMS and NEMS", Chapman & Hall/CRC, pp. 91-98, 177-186.

* cited by examiner (Prior Art)

Pre-shaped transparent plastic substrate 55

Liquid crystal layer 54

Pre-shaped transparent plastic substrate 55

(Prior Art)

(Prior Art)

F I G. 4 (a)
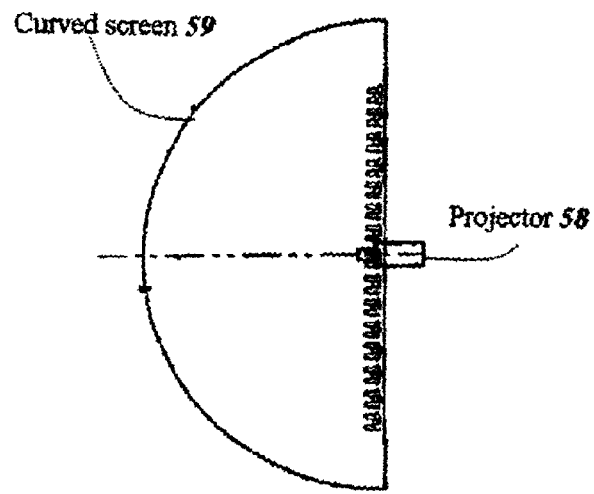
(Prior Art)

*Dual-depth display in added-depth mode*

*Dual-depth display in no-depth mode*

(Prior Art)

F I G. 8 (a)
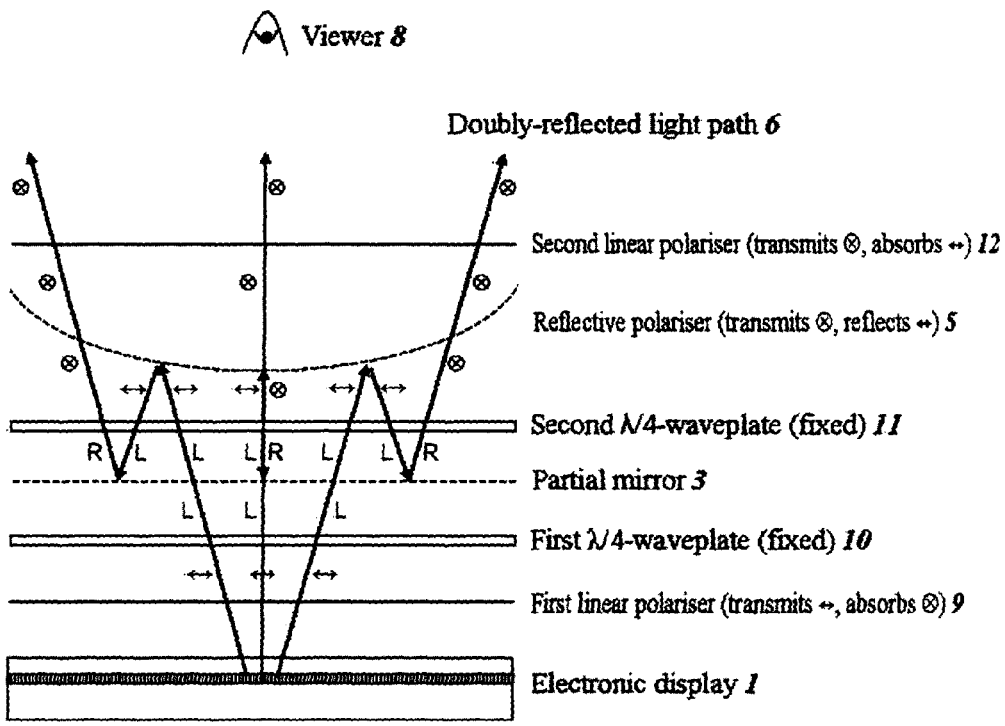
F I G. 8 (b)
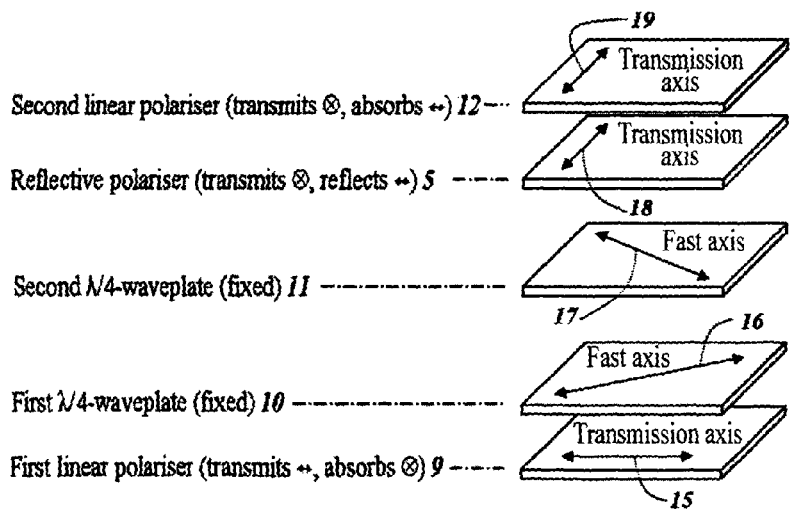

OPTICAL SYSTEM AND DISPLAY THAT CONVERTS A FLAT IMAGE TO A NON-FLAT IMAGE

TECHNICAL FIELD

The present invention relates to an optical system for converting a flat image to a non-flat image. The present invention also relates to a display for producing a non-flat image. Such a display may be used, for example, to provide a curved appearance to the displayed image. Such a display may, for example, be used in information display applications including automotive (for example as an instrument display), advertising, television, games or other amusement applications, immersive display applications and in any applications where enhanced aesthetics may be desirable to the user.

BACKGROUND ART

It is known for vehicles, such as automobiles and aircraft, to include an electronic display providing an image of, for example, an instrument cluster for replacing discrete mechanical or electrical dials. However, such displays are generally aesthetically limited because of their inability to produce images that differ from the standard two dimensional (2D) images displayed in the plane of the display. In addition to reducing the aesthetics of such displays, the inability to produce images that do not appear flat may provide limited realism of such displays. Although stereoscopic and autostereoscopic displays are known and can produce an impression of a three-dimensional image, such displays may produce eye strain and headache problems because of a potential limited freedom of viewing position and focussing issues.

It is also known for advertising displays, such as for example large-area public displays in shopping centres and digital signage displays on motorways, to aim for catching maximum attention from people. Although such displays become more and more common, they generally do not feature any aesthetically appealing features, aside from their large size, that would make them stand out of the ordinary and facilitate their acceptance. Overcoming the inability of such displays to produce images different from standard flat 2D images displayed in the plane of the display may therefore contribute to favour their widespread acceptance.

A first general class of prior art teaches how to make stereoscopic and auto-stereoscopic displays from a single panel. For example, FIG. 1 of the accompanying drawings illustrates a switchable 2D/3D (two dimensional/three dimensional) display based on the use of a parallax barrier, as disclosed in EP0829744. The parallax barrier comprises a polarisation-modifying layer 50, with alternating aperture regions 51 and barrier regions 52, and a polariser in the form of a polarisation sheet 53 which may be disabled. The parallax element provides the possibility of operating the display in a wide view full resolution 2D mode or in a directional 3D autostereoscopic mode. However, this device produces a stereo image pair to generate 3D images rather than images with curved-appearance. Drawbacks of auto-stereoscopic displays include limited head freedom and inconsistency between 3D perception from stereo and from other cues (head motion, focus), leading to user confusion and sometimes eye strain and headaches.

A second general class of prior art is related to curved or conformal displays. For example, FIG. 2 of the accompanying drawings shows a display of the type disclosed in WO94/11779. A curved liquid crystal display is manufactured by sandwiching a liquid crystal layer 54 between two curved pre-shaped transparent plastic substrates 55 or between two flexible substrates.

As illustrated in FIG. 3 of the accompanying drawings, US2006/0098153A1 discloses a display device of the same type but where a curved display is formed by manufacturing a flat panel display layer 56 and thereafter curving the display layer itself by adhering an additional film 57 to it. The additional film may for example have been pre-stretched and the contraction force it releases after adhesion to the display results in the bending of the display.

Although these curved display devices are able to generate curved images, they both rely on displays which have been physically bent in order to produce the desired curvature. Such curved displays have many disadvantages, such as very high cost, limitations in material efficiency and material diversity, and strong difficulty in manufacturing. Further, displays of this type are very limited in their design as the variety of feasible curved-shapes is limited and, once a display has been manufactured with a specific curvature, this cannot be changed. Also, curved displays are not ready for mass-production yet as each production line would need to adapt to a particular curved design.

A final class of prior art concerns displays using projection onto curved surfaces. For example, U.S. Pat. No. 6,727,971 and U.S. Pat. No. 6,906,860 disclose a display of the type illustrated in FIGS. 4a and 4b, respectively, of the accompanying drawings. In both cases, the display comprises at least one projector 58 and a curved screen 59, onto which is projected an image.

Such displays are well-known from the public area and are used for many applications such as the reconfigurable display from Digital Dash or immersive displays. However, they have the disadvantage of requiring a large space and being limited to projection technology only. Also, they are generally defined as constituting a display when considering together the projection system associated with the curved screen and not the projection system by itself.

GB2437553 discloses a family of dual- and multiple-depth displays where a multiple-depth image is generated from a single display panel. Optical elements are placed a short distance in front of a display panel to produce differing depth effects from different optical paths. By use of polarisation effects and partial reflections, different images are associated with light paths of different lengths and appear to originate from different planes. By displaying these images time-sequentially or spatially-interlaced, a multiple-depth effect is achieved.

An embodiment from GB2437553 is shown in FIGS. 5a and 5b of the accompanying drawings. First and second partial reflectors 61 and 62 are placed in front of a liquid crystal display (LCD) panel 60 with polarisation-modifying optics 63 disposed between the first and second reflectors 61 and 62. The first and second reflectors 61 and 62 are separated from each other by an appropriate spacing for producing a depth-shifted image. Light from two different images displayed by the LCD panel 60 travels along different light paths towards the viewer. Light encoding the first image passes directly by transmission through the optical system to the viewing region as shown in FIG. 5b, whereas light encoding the second image follows a "zig-zag" path 64 before reaching the viewer as shown in FIG. 5a. As a result of the different lengths of the different paths 64 and 65, the first image appears at the location of the LCD 60, whereas the second image 66 of the LCD is shifted in depth so as to appear below the LCD. The viewer thus observes images in different depth planes.

Displays of this type have clear advantages over multiple-depth displays using multiple display panels, for example in terms of cost, brightness and volume. However, the main purpose of these displays is to create two images, or more, separated in depth. In addition, the partial reflectors in the optical system of such displays are parallel to each other and to an image surface of the display.

When two images must be presented independently to a viewer from the same underlying display device, there is some leakage or crosstalk between the views and this may be corrected by modifying the image data sent to the display. Crosstalk is effectively removed, but there is also a loss of contrast.

EP0953962 discloses crosstalk correction in 3D and dual-view displays. For these two types of display, crosstalk tends to be symmetric and colour-independent. In other words, the leakage from image 1 to image 2 is the same as the leakage from image 2 to image 1, and also the same for red, green and blue components of the image.

GB2437553 discloses the same basic principle of crosstalk correction but applied to dual-depth displays. For this type of display, crosstalk tends to depend upon the direction of leakage as well as on colour.

DISCLOSURE OF INVENTION

According to a first aspect of the invention, there is provided an optical system for converting a flat image to a non-flat image, the optical system comprising first and second spaced-apart partial reflectors, at least one of which is non-flat, and providing a first light path for a first light incident on the first reflector, the first light path comprising at least partial transmission through the first reflector towards the second reflector, at least partial reflection from the second reflector towards the first reflector, at least partial reflection from the first reflector towards the second reflector, and at least partial transmission through the second reflector, the optical system being arranged substantially to prevent emission from the second reflector of the first light not reflected during reflection by the first and second reflectors, wherein light incident on the second partial reflector for the first time does not leave the optical system.

The optical system may be arranged to change the polarisation of the first light during passage along the first path. The optical system may be arranged to change the polarisation of the first light during passage along the first path between incidence on the second reflector and reflection from the first reflector.

The optical system may be switchable to a flat image mode to provide a second light path different from the first path. The second light path may comprise at least partial transmission through the first reflector towards the second reflector and at least partial transmission through the second reflector. The optical system may be arranged substantially to prevent emission from the second reflector of a second light not transmitted by the second reflector in the flat image mode.

The system may include a lens arrangement for at least partially correcting for image distortion by the or each non-flat one of the first and second reflectors.

The at least one of the first and second reflectors may be continuously curved in at least one direction for producing a concave or convex image.

The at least one of the first and second reflectors may comprise a plurality of flat segments, adjacent ones of which abut each other along an edge and subtend an angle greater than 0° and less than 180°.

The at least one of the first and second reflectors may have a serpentine cross-section.

Both of the first and second reflectors may be non-flat. The first and second reflectors may have mirror-image shapes.

The system may comprise at least one quarter wave plate. The quarter wave plate or a second of the quarter wave plates may be disposed between the first and second reflectors. The quarter wave plate or a second of the quarter wave plates may be disposed on a side of the first reflector opposite the second reflector.

The first reflector may comprise a first partial mirror. The first partial mirror may comprise a patterned mirror associated with an array of converging lenses.

The first reflector may comprise a first reflective polariser.

The second reflector may comprise a second reflective polariser. The second reflective polariser may comprise a cholesteric reflector. The cholesteric reflector may be disablable. The second reflective polariser may be non-flat and the system may comprise a first prism film arranged to redirect light from the first partial reflector to be incident substantially normally on the second reflective polariser. The system may comprise a second prism film arranged to redirect light from the second reflective polariser to the direction of light incident on the first prism film.

The second reflector may comprise a second partial mirror.

The system may comprise a half wave plate. The half wave plate may be disablable. The half wave plate may be a directional half wave plate.

The system may comprise a Faraday rotator. The Faraday rotator may be arranged to provide 45° of polarisation rotation.

The at least one of the first and second reflectors may be of controllable variable shape.

The system may comprise an input linear polariser.

The system may comprise an output linear polariser.

According to a second aspect of the invention, there is provided a display comprising: a display device for modulating a first light with an image or sequence of images at an image display surface of the device; and an optical system for varying the perceived image depth across the display surface.

The system may be a system according to the first aspect of the invention and the first reflector may be disposed between the device and the second reflector.

The display surface may be substantially flat.

The device may comprise one of a liquid crystal device, a projection display device, an organic light emitting diode device, a plasma light emitting device and a cathode ray tube.

The display may comprise at least one of an instrument display, an advertising display, an immersive display and an amusement display.

The display may comprise an image processor for remapping image pixels to correct at least partially for image distortion by the or each non-flat one of the first and second reflectors.

The display may comprise an image processor for remapping colour channels of image pixels to correct at least partially for light exiting the optical system along an unintended light path.

The display may comprise an image processor for manipulating grey levels of image pixels to increase at least partially the apparent brightness of at least part of the image.

The optical system may comprise a removable attachment attached to the device.

The display may include a touch panel.

It is thus possible to provide an arrangement which allows a non-flat image to be created in a relatively simple way. For example, a conventional or unmodified display device may be used and the flat or substantially flat image produced by such a device can be converted into a non-flat image, for instance a curved image. This may be achieved with commonly available and relatively low cost optical elements. Viewing freedom and image resolution may be the same or substantially the same as for the basic display device. An aesthetically desirable or more striking appearance may thus be provided.

BRIEF DESCRIPTION OF DRAWINGS

FIGS. 8a and 8b are diagrams illustrating the structure and operation of the display of FIG. 7;

Like reference numerals and characters refer to like parts throughout the drawings.

BEST MODE FOR CARRYING OUT THE INVENTION

Figure 1:
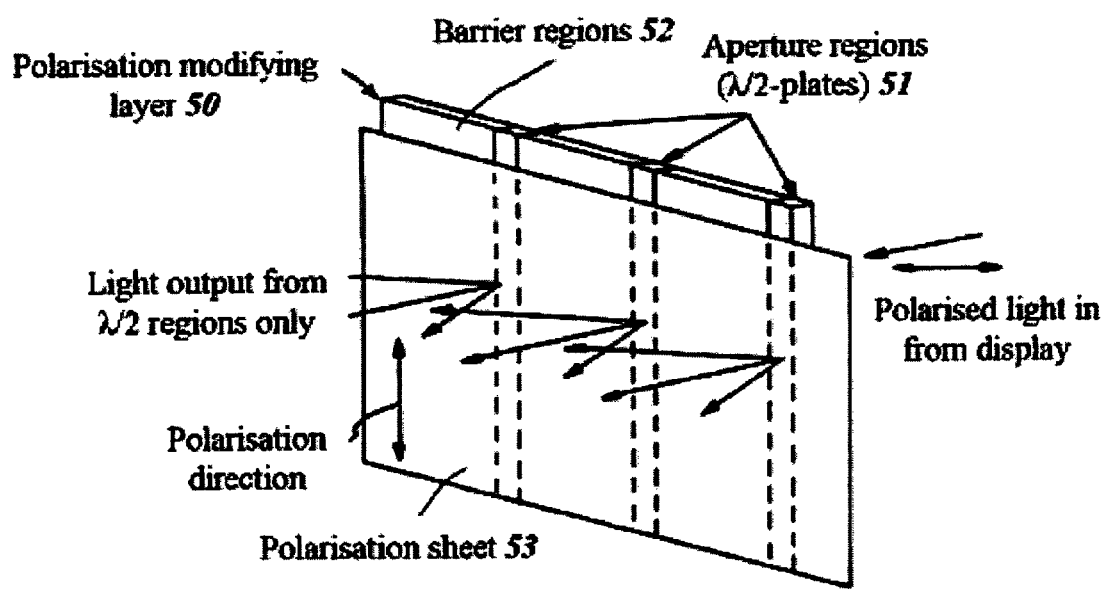
FIG. 1 is a diagram illustrating a known technique for creating an autostereoscopic display switchable between a 2D-mode and a 3D-mode.
Figure 2:
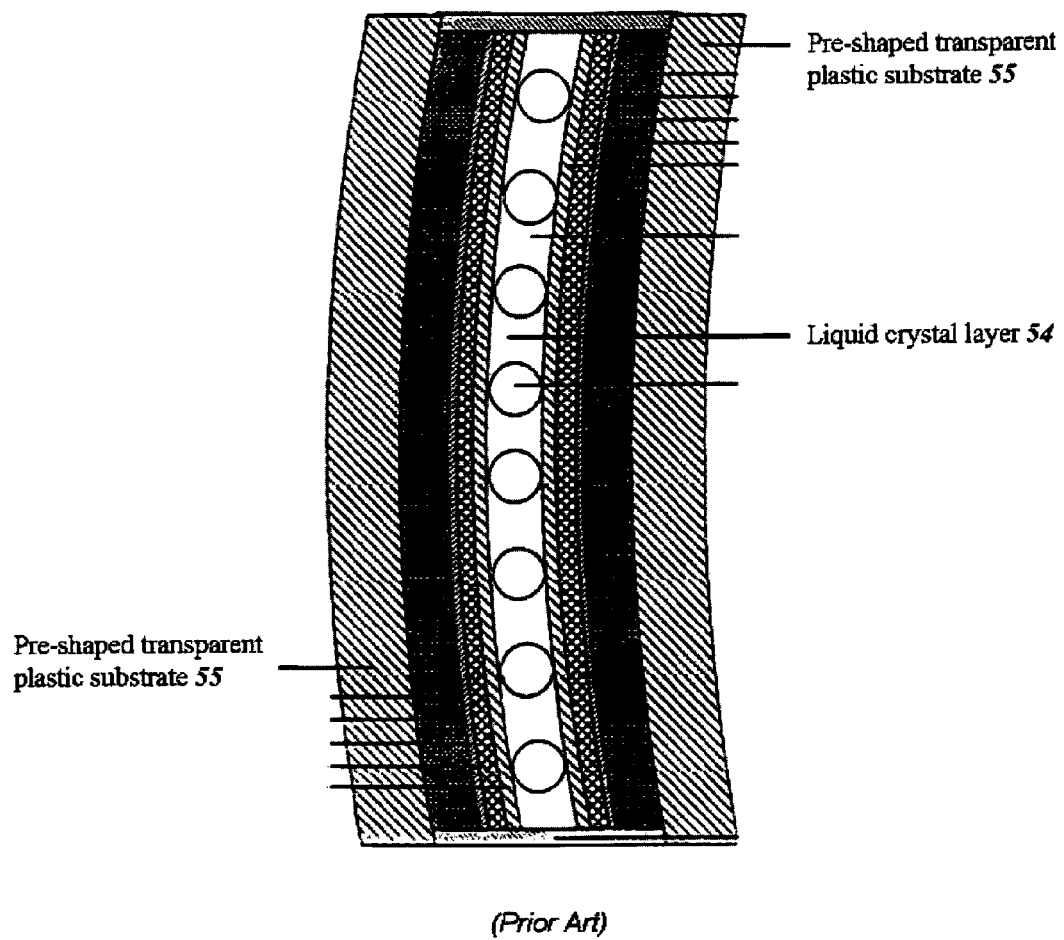
FIG. 2 is a diagram illustrating a known type of a curved display.
Figure 3:
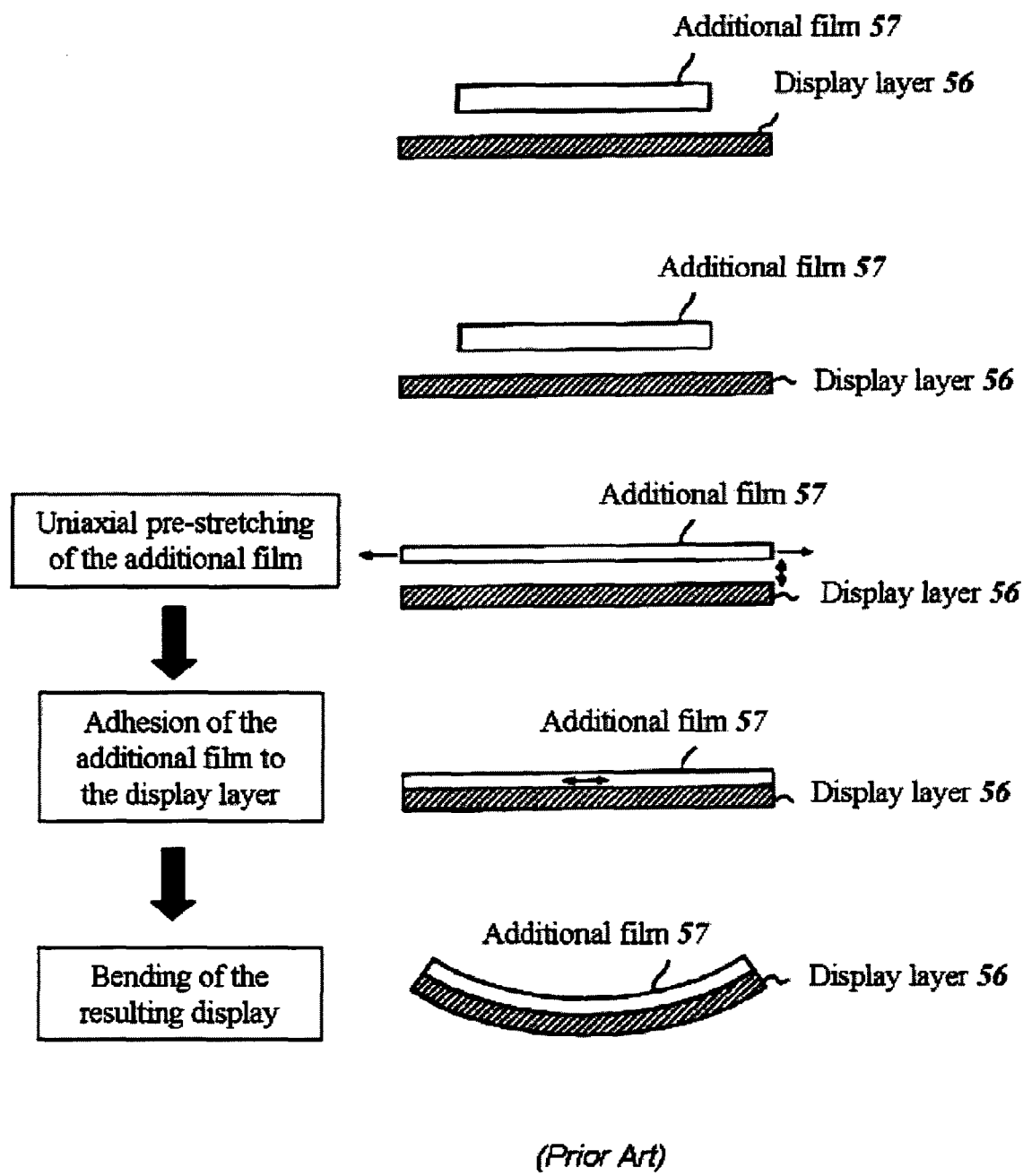
FIG. 3 is a diagram illustrating a known method for creating a curved display.
Figure 4:
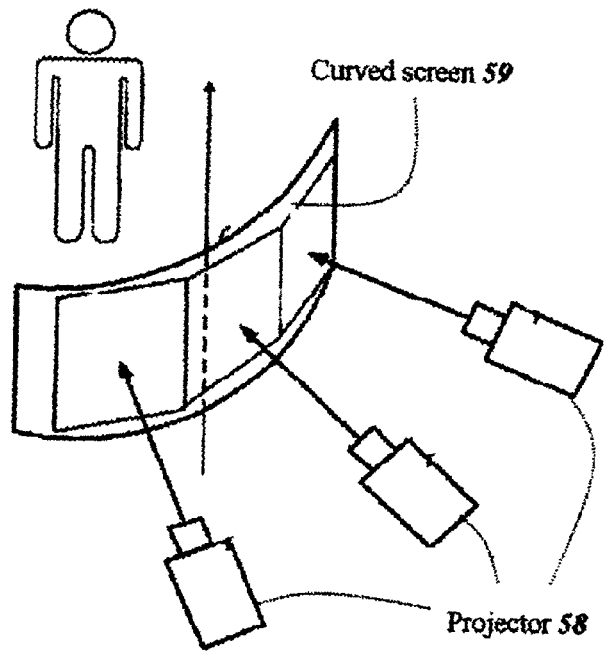
FIGS. 4a and 4b are diagrams illustrating known types of displays using projection onto curved surfaces.
Figure 5:
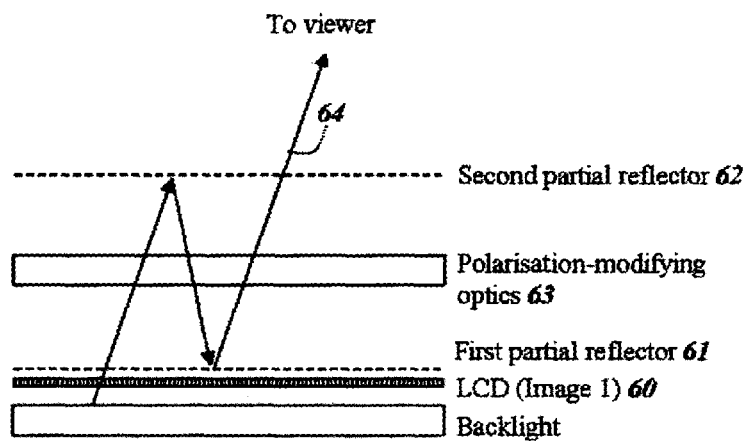
FIGS. 5a and 5b are diagrams illustrating a dual-depth display.
Figure 5:
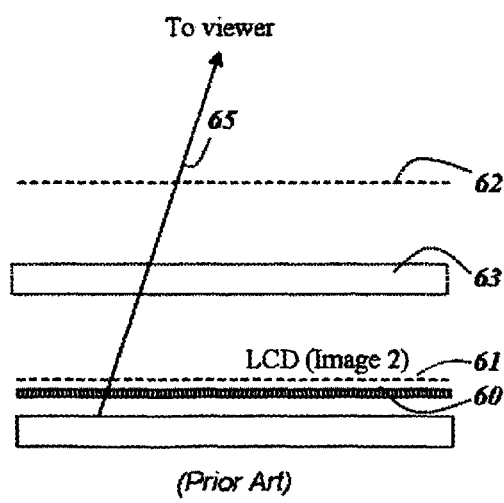

All drawings relating to embodiments of the invention illustrate only ray paths which reach the viewer. Additional rays which are not contributing to the main operation of the display device are omitted in order to enhance the clarity of the drawings.

Also, R is used to mean right-handed circularly polarised light and L to mean left-handed circularly polarised light. The symbol ↔ is used in the diagram to show light linearly polarised with its electric field vector in the plane of the drawing, and ↔ is used to show linear polarisation with the electric field perpendicular to the plane of the drawing.

In addition, the term 'curved' as used herein means any form of distortion from substantially planar. For example the term 'curved-appearance' could also refer to a 'wedge-appearance'.

Figure 6:
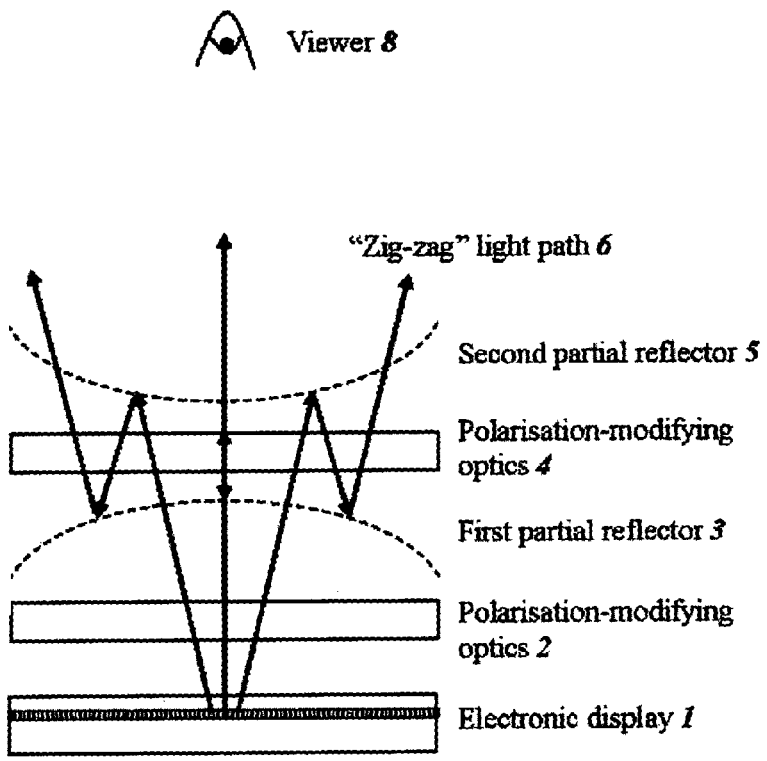
FIGS. 6a and 6b are diagrams illustrating a display constituting a generalised embodiment of the invention.
Figure 6:
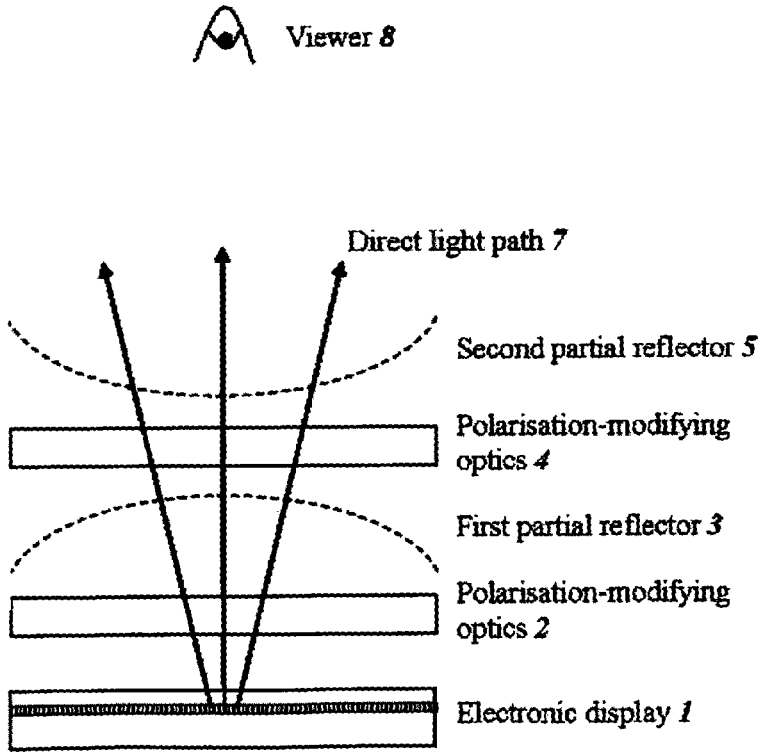

The display shown in FIGS. 6a and 6b comprises an electronic display 1 capable of outputting light and having a display surface which is substantially flat. First and second partial reflectors 3 and 5 are disposed in front of the electronic display 1 (on the viewer side thereof) with polarisation-modifying optics 2 and 4 disposed respectively between the electronic display 1 and the first reflector 3 and between the reflectors 3 and 5. The reflectors 3 and 5 are shaped in an appropriate manner for producing an image with curved appearance.

For example, the partial reflectors 3 and 5 may be arranged to reflect one polarisation state of light and to transmit the orthogonal state or may be partially reflecting mirrors (or combinations of reflecting elements) of some other type. The polarisation-modifying optics 2 and 4 are arranged to change at least one polarisation state of light passing in either or both directions through the optics 2 and 4.

The display may optionally be operated in such a way as to switch between a mode displaying standard 2D-images and a mode displaying images with curved appearance.

In the curved-appearance mode, shown in FIG. 6a, the elements 1 to 5 are arranged such that light from images or sequences of images displayed by the electronic display 1 travels to an extensive viewing region where one or more viewers 8 may be located.

Light is at least partially transmitted by the first reflector 3 towards the second reflector 5. The second reflector 5 reflects at least part of this light towards the first reflector 3, which reflects at least part of the incident light back towards the second reflector 5. The second reflector 5 transmits at least part of the reflected light to the viewing region so that image light follows a "zig-zag" first path 6 before reaching a viewer 8. The display is arranged such that light encoding the image or image sequence does not pass directly by transmission through the reflectors 3 and 5 to the viewer 8. The reflectors 3 and 5 are arranged such that light encoding the image or sequence does not have the same path length in different directions and describes preferably a curved-shape function.

The display thus has a virtually curved appearance to allow a viewer 8 to see images with a curved appearance.

In the curved-appearance mode, the optical system comprising the elements 2 to 5 is arranged such that "first" light which is not reflected during reflection by the first and second reflectors 3 and 5 is prevented from being emitted by the second reflector 5 towards the viewer 8. Blocking of such light may occur at the second reflector 5 or at further elements which may be present between the second reflector 5 and the viewer 8. Specific examples of such arrangements are described in detail hereinafter. The optical system is also such that light which is incident on the second reflector 5 for the first time, for example having been emitted by the electronic display 1 and partially transmitted by the first reflector 3, is prevented from leaving the optical system. Again, specific examples for achieving this are described in detail hereinafter.

In the standard 2D-mode, or "flat image mode", shown in FIG. 6b, light from images or sequences of images displayed by the electronic display 1 is transmitted at least partially by the reflectors 3 and 5 so as to follow an essentially direct second path 7 to the viewing region. The curvatures given to the reflectors 3 and 5 do not influence the path that light emitted from the display 1 follows and the image appears substantially at the location of the electronic display 1.

Whether light follows the path 6 or the path 7 may be controlled in a number of different ways. Examples of these will be described in further detailed description of possible embodiments of the invention.

The electronic display 1 may be of different types and still perform the same function. Spatial light modulator displays, such as Liquid Crystal Displays (LCDs) and projection display systems, and emissive displays, such as Cathode Ray Tube displays (CRTs), Plasma Display Panels (PDPs) and Organic Light Emitting Diode displays (OLEDs), are all, but not exclusively, examples of display devices that may be suitable to be used as virtually curved appearance displays.

Figure 7:
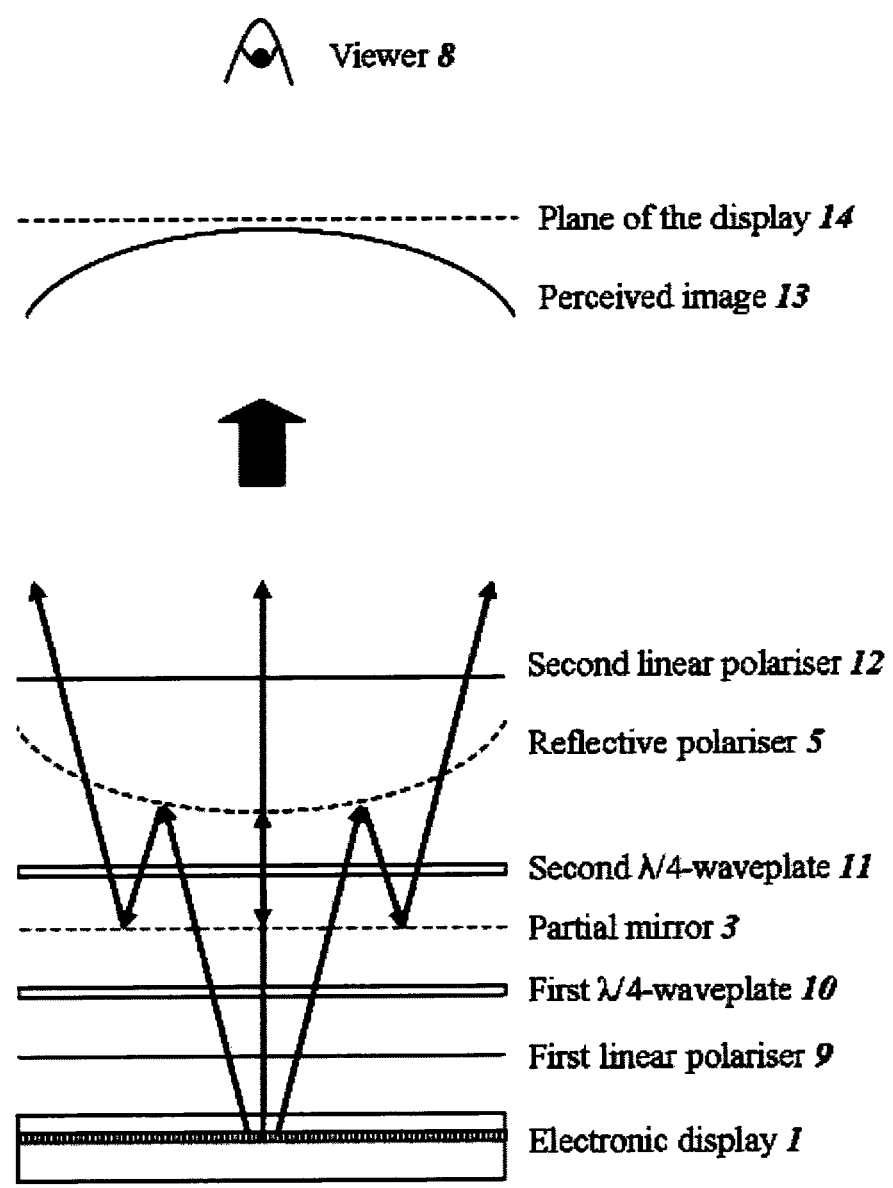
FIG. 7 is a diagram illustrating a display constituting a first embodiment of the invention.

FIG. 7 illustrates a display of the type shown in FIGS. 6a and 6b. In this embodiment, an electronic display 1 is disposed below a stack of optical layers as shown in FIG. 7. The successive layers are as follows.

A first absorbing linear polariser 9 is disposed in front of the electronic display 1. An absorbing linear polariser is an element which transmits one linear polarisation state of light, for instance horizontally polarised light, and absorbs the orthogonal one, for instance vertically polarised light.

A first fixed quarter-wave plate 10 is disposed above the first linear polariser 9 and introduces a one-quarter period phase difference between two polarisation states of light passing through it. Such a film is oriented so as to convert incoming linearly-polarised light into circularly-polarised light, or the reverse. Although the first quarter-wave plate 10 may simply comprise a film of birefringent material of the appropriate thickness, such a film performs the quarter-wave function actually for a single-wavelength. The first quarter-wave plate 10 may be formed from a plurality of birefringent layers in order to provide an element which acts as an ideal-quarter-wave plate for a range of wavelengths across the visible spectrum. Such films are manufactured by Nitto Denko Corporation of Japan, by Sanritz Corporation of Japan, and by other companies.

The first partial reflector 3 comprises a partially reflecting and partially transmitting mirror. The first partial mirror 3 is also referred to as a "50%" mirror as it reflects substantially half of the incident light and transmits substantially half of the incident light.

The first partial mirror 3 may be realised by coating a thin layer of metal such as aluminium on a transparent substrate or by coating transparent dielectric layers (also referred as a dielectric mirror). Partial reflection may be achieved either by making the reflecting layer uniformly partially transparent or by using a completely reflecting mirror with transparent gaps or holes. If these gaps or holes are on a scale smaller than those visible to the eye, the hole or gap pattern will not be visible and the mirror will appear partially reflecting and partially transparent. Another alternative is to make the partial mirror of varying density in order to help reduce potential Moiré fringes due to regular patterning. The reflectivity of the partial mirror may be varied by thinning the layer of metal or by spatially patterning on a small scale.

For mirrors constructed from metal layers, the use of holes or gaps may be preferable to a uniform partial reflector for two reasons: it may be difficult to accurately control layer thickness to achieve a reproducible and uniform reflectivity in a uniform layer, and dependence of reflectivity on polarisation state may be weaker in a mirror with holes than in a uniformly partially reflecting mirror.

However, in all embodiments described hereinafter, the first partial reflector 3 may be a partial mirror of any type previously described and the fraction of light transmitted or reflected from the first partial mirror 3 may be varied in order to control the relative brightness of the desired curved image to be displayed.

A second quarter-wave plate 11 is disposed above the first partial reflector 3. This second quarter-wave plate 11 has the same optical properties as the first quarter-wave plate 10. However, both quarter-wave plates 10 and 11 may be placed in the optical system with different orientations of their fast axes.

The second partial reflector 5 comprises a ("second") reflective polariser. A reflective polariser is an optical layer which transmits one linear polarisation state of light while reflecting the orthogonal state. Such a polariser may, for example, comprise a wire-grid polariser of the type manufactured by Moxtek Inc., or a directional brightness enhancing film (DBEF) manufactured by 3M. Where the electronic display 1 requires an exit polariser, the reflective polariser 5 may be used as the exit polariser or may be provided in addition to the exit polariser.

The final element in the optical system is a second absorbing linear polariser 12. This second linear polariser 12 is used as the exit polariser and it has the same optical properties as the first absorbing linear polariser 9. In addition, this second absorbing linear polariser 12 is used as a cleaning polariser by absorbing light with the wrong polarisation state that could have leaked from the reflective polariser 5 instead of being reflected. This linear polariser 12 is also used to reduce reflections of ambient light from the display. Without the absorbing polariser 12, light with polarisation orthogonal to the transmission axis of the reflective polariser 5 is reflected from the top of the display. This reflected light may interfere with viewing of the display. The absorbing polariser 12 prevents or greatly attenuates such reflected light. To attenuate further this ambient light reflection, an anti-reflection coating layer may be added on top of the exit linear polariser 12. In all embodiments described hereinafter, the exit polariser 12 may be omitted as its role of cleaning polariser is not necessary to the good operation of the display but is only recommended.

As for all embodiments described hereinafter, optical components constituting the optical system of the curved-appearance display may be either separated from each other by an air interface or in contact with each other by means of index-matching between layers using an element (such as glue film or fluid) with the appropriate refractive index. Although index-matching between layers is preferable in order to reduce Fresnel reflections within the system and therefore reduce potential losses and imaging problems, one arrangement may in practice be preferable to another according to the application. Where air gaps are used in the system, an anti-reflection coating on one or more adjacent surfaces may be desirable.

Operation of the display is illustrated in FIGS. 8a and 8b. Details of polarisation states of the light and optical axis orientation of most elements of the optical system have been given as an example. However, although many other configurations may have been possible, it will be appreciated that further drawings of all embodiments hereinafter may illustrate only one possible orientation.

The linear polariser 9 has a transmission axis 15 oriented in the plane of the drawing and the first quarter-wave plate 10 has a fast axis 16 oriented at 45° to the transmission axis 15. Light coming out from the electronic display 1 passes through the linear polariser 9 and is polarised with its electric field vector in the plane of the drawing. This light is then converted into left-handed circularly-polarised light by the first quarter-wave plate 10 and hits the partial mirror 3, which transmits half the light towards the second quarter-wave plate 11 and reflects half the light towards the electronic display 1.

In the case of an LCD used as the electronic display 1, light exiting the display is already linearly-polarised and the polariser 9 may be omitted. This statement is true and can be applied to this embodiment and all other embodiments to follow, whenever a linear polariser 9 is used as entrance polariser.

The partial mirror 3 imparts a 180° phase change on reflection causing the left-handed circularly-polarised reflected light to be changed into right-handed circularly-polarised light. This light is then transformed back into linearly-polarised light by the first quarter-wave plate 10, but this time in a direction orthogonal to the plane of the drawing. This linearly-polarised light is then absorbed, and therefore blocked, by the linear polariser 9 and considered as lost within the system.

The second quarter-wave plate 11 has a fast axis 17 orthogonal to the fast axis 15 of the first quarter-wave plate 10, both quarter-wave plates 10 and 11 being therefore subtractive in transmission. The transmitted left-handed circularly-polarised light is converted by the second quarter-wave plate 11 back into linearly-polarised light with its electric field vector in the plane of the diagram. In this case, incoming light has the same polarisation state as that reflected by the reflective polariser 5 and is then reflected back toward the top quarter-wave plate 11. This linearly-polarised light is converted back into left-handed circularly-polarised light by the quarter-wave plate 11 and hits again the partial mirror 3.

The portion of this light which is transmitted by the partial mirror 3 is converted by the bottom quarter-wave plate 10 to light which is linearly-polarised in a direction parallel to the plane of the drawing. This light is transmitted back into the electronic display 1 by the linear polariser 9 and then considered as lost within the system.

The portion of light which is reflected by the partial mirror 3 undergoes a 180° phase change on reflection causing the direction of circular polarisation to change. In this case, incident left-handed circularly-polarised light is changed into right-handed circularly-polarised light. This reflected right-handed circularly-polarised light passes through the top quarter-wave plate 11 and is changed back to linearly-polarised light with its electric field vector perpendicular to the plane of the drawing. The reflective polariser 5 and the linear polariser 12 have both their transmission axis 18 and 19 oriented perpendicular to the plane of the drawing. Since the incoming light now has the same polarisation state as the one transmitted by the reflective polariser 5 and the absorbing polariser 12, it can exit the device and so may reach the viewer 8.

The only light which passes to the viewer 8 is therefore light which follows the doubly reflected path 6 as described above. As illustrated in FIG. 7 and FIGS. 8a and 8b, the reflective polariser 5 is bent towards the edge of the display. The light path therefore becomes longer as the light passes towards the edge of the display. The viewer 8 sees an image of the electronic display 1 that appears curved and below its true position.

In the first embodiment and all following embodiments based on a similar configuration, details and configuration of the display system may be varied in a number of ways so as to optimise the performance for different applications.

For example, as described above, the partial mirror 3 reflects approximately 50% of light incident upon it and transmits approximately 50%. This leads to the final curved image 13 (shown in FIG. 7) seen by the viewer 8 having a brightness which is approximately one-quarter of its original brightness as displayed by the electronic display 1. Although this brightness value of one-quarter is the highest achievable with the system configuration of this embodiment, it will be appreciated that, for further embodiments of this invention, the optical properties of the partial mirror 3, for instance the reflectivity/transmissivity ratio, may be varied to select the relative brightness of the displayed image. In other words, the partial mirror 3 is designed for optimum performance of the system.

Some re-ordering and re-orientation of the optical elements are also possible without altering the essential nature of the device and the way in which the display operates. For example, first and second quarter-wave plates 10 and 11 can be swapped or rotated as long as orientation of their fast axes stays crossed. Equally, linear polarisers 9 and 12 can be swapped or rotated as long as their transmission axes are crossed and the reflective polariser 5 is rotated such that its transmission axis matches that of the exit polariser 12.

Alternative orientations of the optical elements which function in slightly different ways are also possible. Fast axes 16 and 17 of first and second quarter-wave plates 10 and 11 may be orthogonal or parallel to each other as long as transmission axes 15, 18 and 19 of the entrance polariser 9, the reflective polariser 5 and the exit polariser 12 are oriented in suitable directions such that the display operation is not changed.

Figure 9:
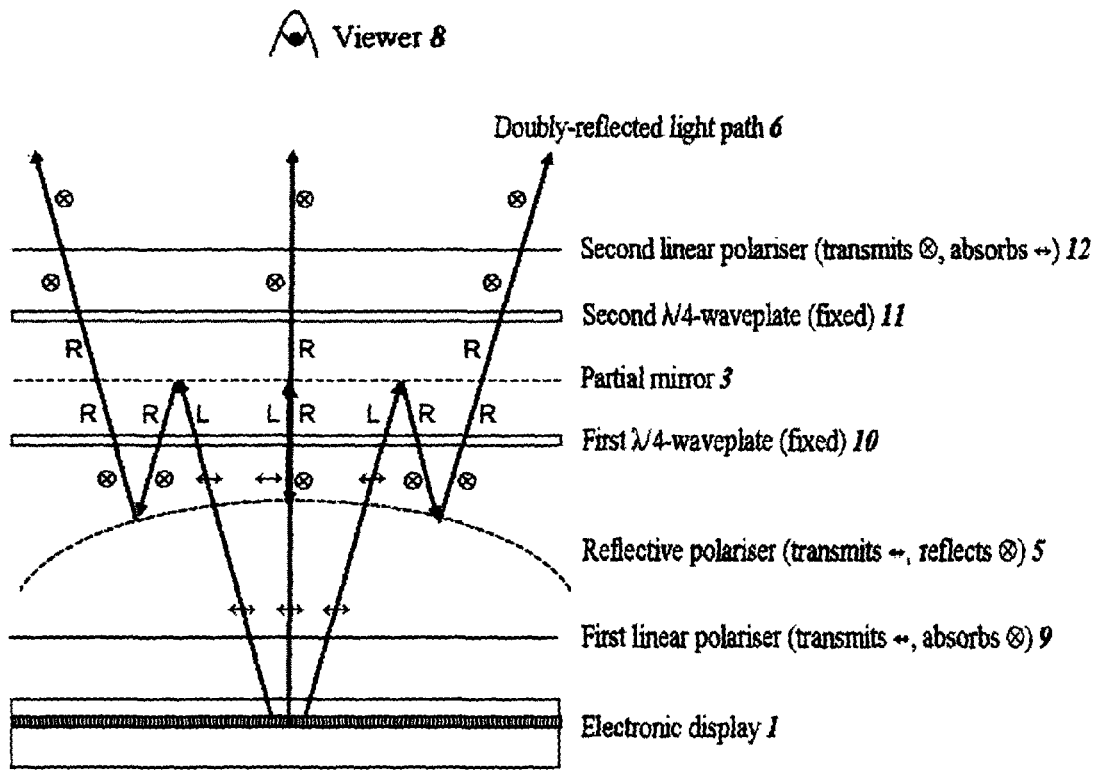
FIGS. 9a and 9b are diagrams illustrating a modified structure and operation of another example of the first embodiment of the invention.
Figure 9:
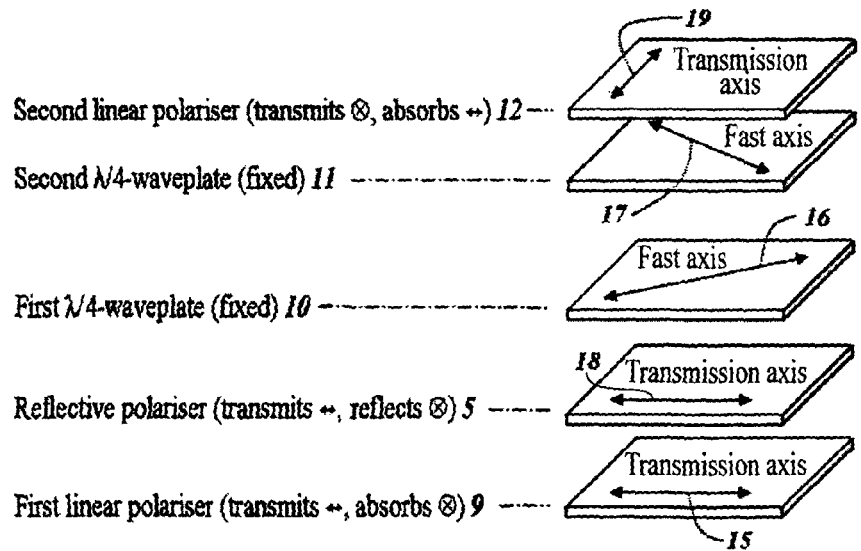

Another alternative implementation, which uses a different arrangement of the optical elements, is shown in FIGS. 9a and 9b. It also functions in slightly different ways from the configuration shown in FIGS. 8a and 8b, but the display itself still performs the same function. As illustrated in FIGS. 9a and 9b, the system is using the same optical components but reordered in a reverse configuration.

Light emerging from the electronic display 1 is converted into linearly-polarised light by the linear polariser 9. This light passes through the ("first") reflective polariser 5 as the transmission axis 18 of this film is oriented in the same direction as the transmission axis 15 of the entrance polariser 9 underneath. Light is then transformed into left-handed circularly-polarised light by the first quarter-wave plate 10 and hits the ("second") partial mirror 3. Half the light is transmitted and is absorbed by the exit linear polariser 12, while the other half undergoes a 180° phase change on reflection and is transformed into right-handed circularly-polarised light. This reflected light passes again through the first quarter-wave plate 10 and becomes linearly-polarised with its electric field vector perpendicular to the plane of the diagram. It is then reflected by the reflective polariser 5 and converted to right-handed circularly-polarised light when passing through the first quarter-wave plate 10. This right-handed circularly-polarised light hits the partial mirror 3 and, once again, half the light is reflected and returns back into the electronic display 1, while the other half is transmitted. This transmitted light passes through the second quarter-wave plate 11 and is changed to linearly-polarised light which has the same polarisation state as that transmitted by the linear polariser 12. Light can therefore exit the system and reach the viewer 8. As the reflective polariser is bent towards the edge of the display, the doubly-reflected light path 6 is longer towards this direction and an image with curved appearance is observed in the viewing region.

In principle, these variations in the ordering of the optical elements do not change the performance of the display but, because of deviations in the optical elements from ideal behaviour or because of dependence of their properties on wavelength and/or viewing-angle, one arrangement may be preferable to another in practice.

Figure 10:
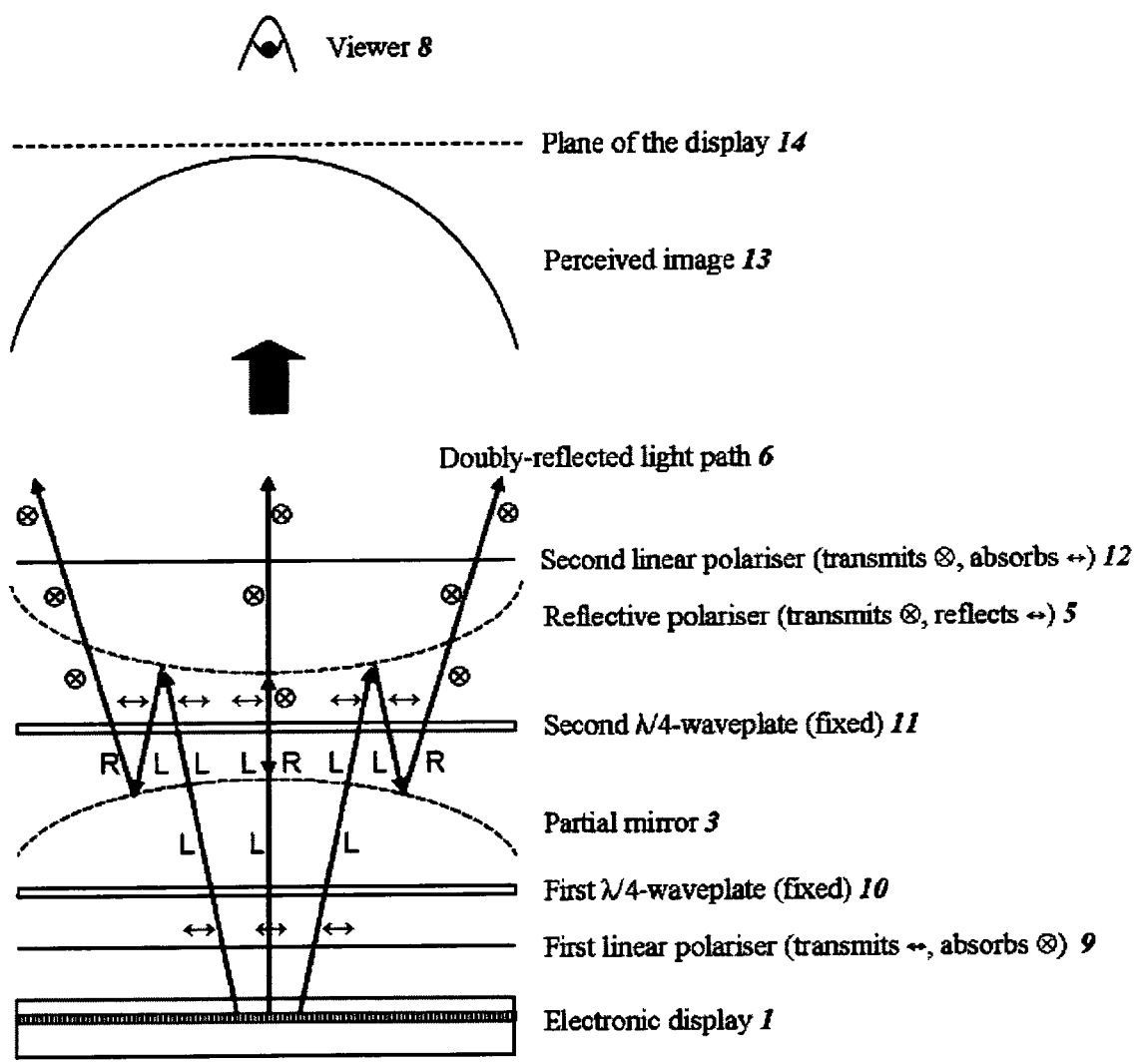
FIG. 10 is a diagram illustrating a further modified structure and operation of a further example of the first embodiment of the invention.

FIG. 10 illustrates a display in which both partial reflectors 3 and 5 are given a curved-shape in order to increase the perceived curved-appearance 13 of the electronic display 1. Light emanating from the electronic display 1 passes through the entire optical system as described previously. Once again, partial reflections within the optical system occur and light follows a double reflection path 6. This time however, because both the partial mirror 3 and the reflective polariser 5 are curved towards the edge of the display and in opposite directions, the optical light path 6 becomes even longer towards the edge of the display and the curved appearance of the display is reinforced.

In this configuration, the partial mirror 3 and the reflective polariser 5 are bent towards the edge of the display. It will be appreciated that the shape into which they may be bent may vary with the preferred curvature appearance that a desired application requires.

Figure 11:
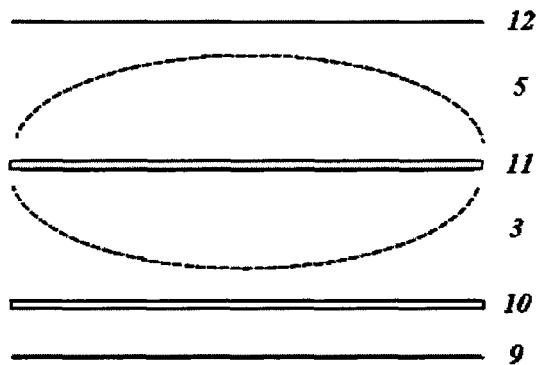
FIGS. 11a to 11d are diagrams illustrating examples of reflector shapes for use in embodiments of the invention.
Figure 11:
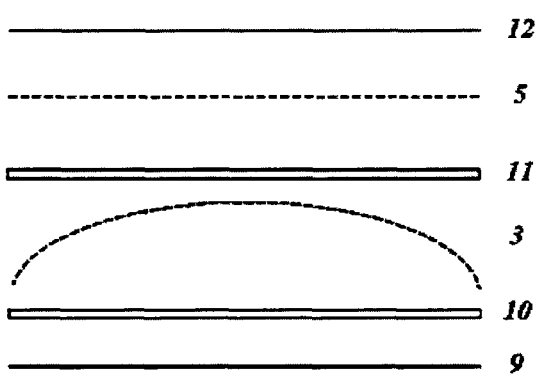
Figure 11:
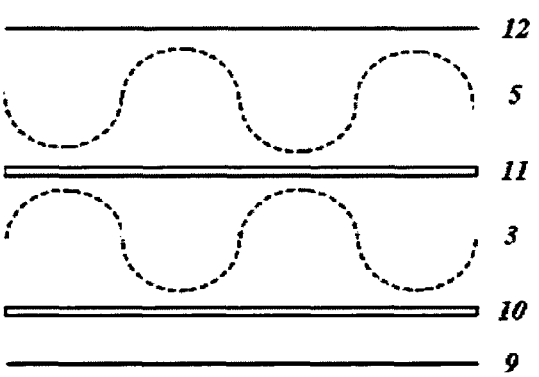
Figure 11:
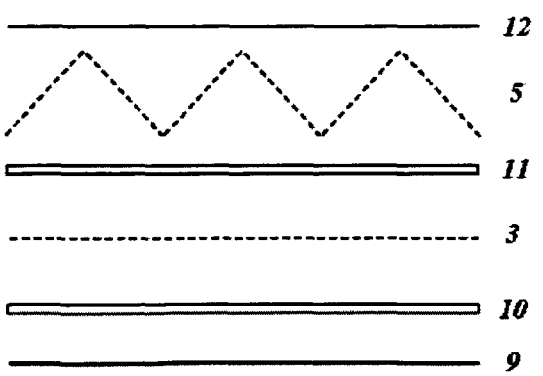
Figure 12:
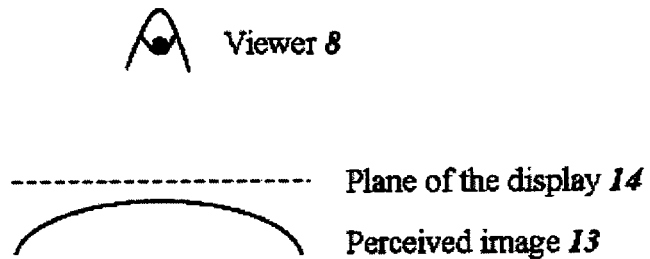
FIGS. 12a to 12d are diagrams illustrating examples of perceived image depths using the reflectors of FIGS. 11a to 11d.
Figure 12:
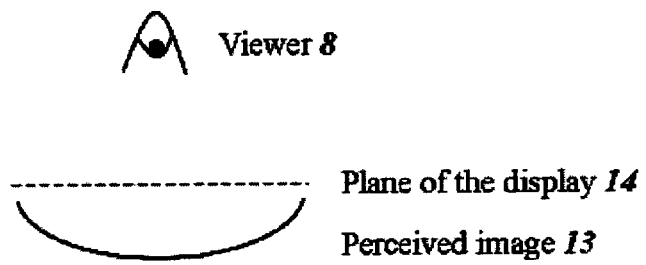
Figure 12:
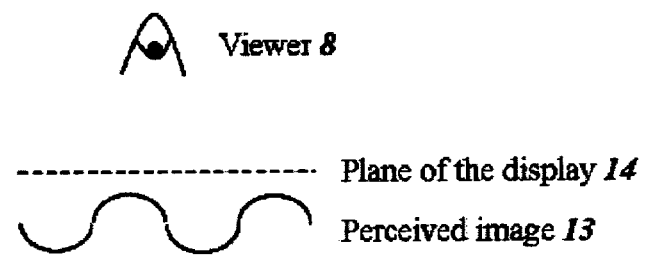
Figure 12:
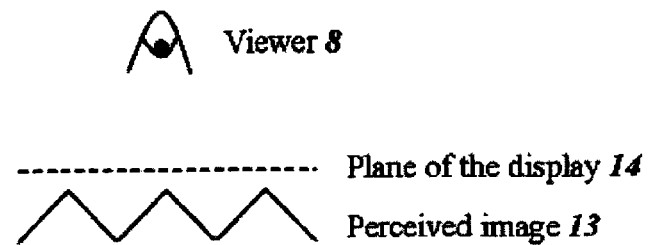

Alternative implementations are illustrated in FIGS. 11a to 11d but potential possibilities are not limited to those examples only. For instance, FIG. 11a shows a configuration where both the partial mirror 3 and the reflective polariser 5 are bent towards the edge of the display, but in opposite directions from those shown in FIG. 10. In FIG. 11b, only the partial mirror 3 is bent while the reflective polariser 5 is flat. In the arrangements shown in FIGS. 11a and 11b and in the previously described embodiments, the reflections which are curved are continuously curved in at least one direction to be smoothly convex or concave towards a viewer.

The curved shape given to at least one of the reflective films 3 and 5 may be more complicated and not necessarily curved as shown in FIGS. 11c and 11d with respectively a wavy curvature and a prismatic curvature. FIG. 11c shows a reflector having a serpentine cross-section to provide a smoothly or continuously curved wave-like reflector. FIG. 11d shows a reflector comprising a plurality of flat segments where adjacent segments abut each other along an edge and subtend an angle greater than 0° and less than 180°.

FIGS. 11a and 11c also show examples where both reflectors are non-flat and have mirror-image shapes. Such mirror-image shapes are symmetrical about a plane mid-way between the reflectors.

Different combinations of curvature given to both reflective films 3 and 5 will lead to different appearances of the perceived image 13 of the display. FIGS. 12a to 12d give a few examples of different curved images appearing below their true position. For instance, the image could appear curved towards the edge of the display or it could appear curved towards the centre of the display.

A further advantage of having at least one curved reflective layer is that, because many combinations of curvatures are achievable, it is possible to make a display appear curved in a variety of different shapes and also potentially below or in front of the plane 14 of the display.

However, some curvature arrangements given to the reflective layers 3 and 5 may lead to imaging issues. For example, if at least one of the reflective films has been bent in a slightly incorrect way and/or if the reflective films have not been disposed exactly in the required positions relative to each other, some imaging issues such as magnification or de-magnification of the displayed image may occur. In order to correct for such potential imaging issues, a carefully selected lens system 20 may be disposed within the optical system as illustrated in FIG. 13.

The chosen lens system 20 may be positioned anywhere within the optical system and is designed to optimise the correction benefit. For instance, the lens system 20 may be placed between the upper reflective polariser 5 and the exit linear polariser 12 and may comprise a single lens, a Fresnel lens or a micro-lens array.

Figure 13:
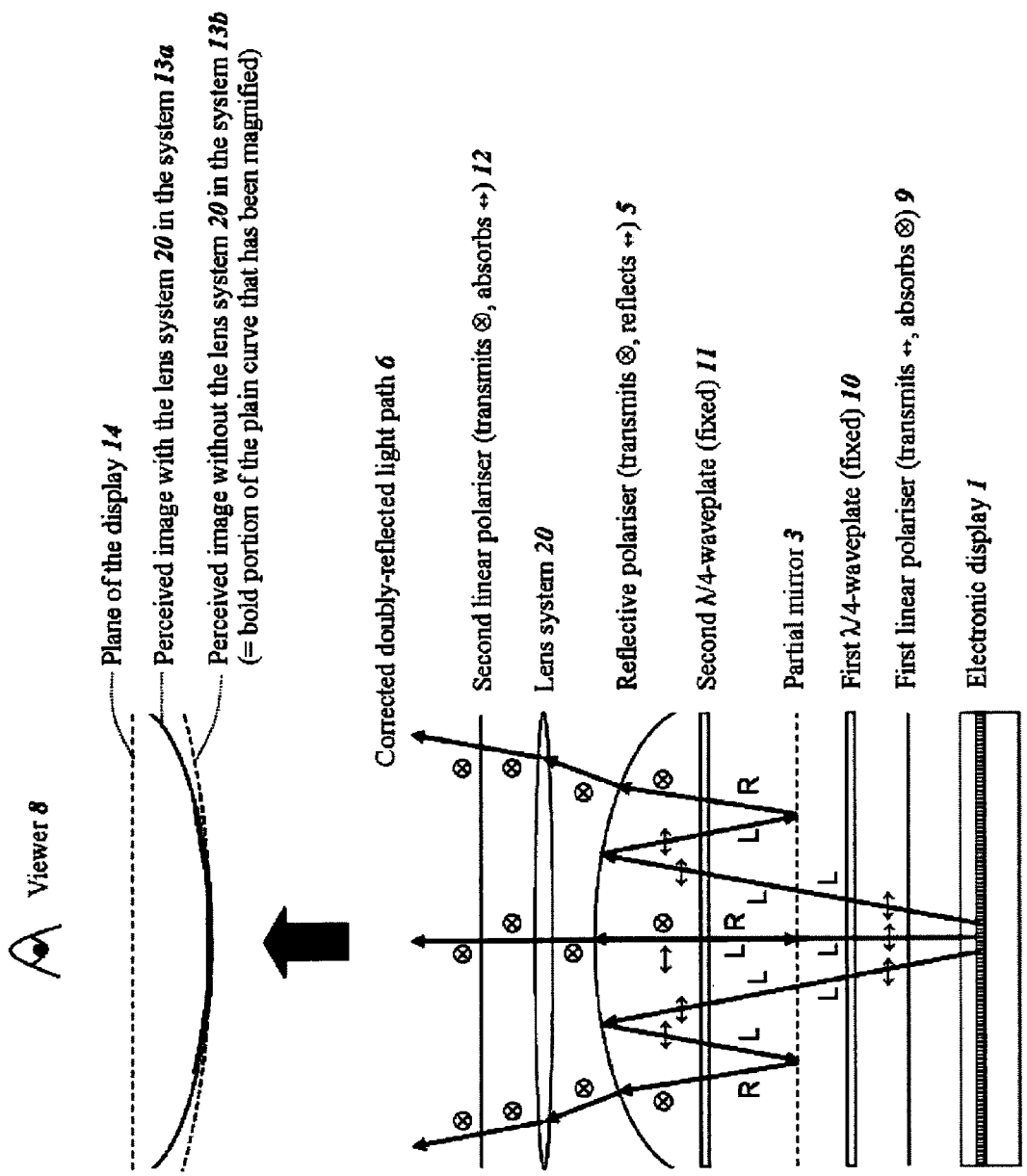
FIG. 13 is a diagram illustrating a display constituting a further modified example of the first embodiment of the invention.

By way of particular example, the reflective polariser 5 may be bent towards the edge of the display as shown in FIG. 13, while the partial mirror 3 is substantially "flat". In such a case and with no additional lens system 20 in the optical system, the image of the display 13b perceived by the viewer 8 would normally be magnified. When adding an appropriately chosen lens system 20 between the reflective polariser 5 and the linear polariser 12, the operation of the display until light passes through the reflective polariser 5 is not changed with regard to the display shown in FIG. 7. However, magnified light emerging from the reflective polariser 5 passes through the lens system 20, which rectifies for the image magnification by adjusting the light path. By means of this lens system 20, light exiting the system follows the corrected doubly-reflected light path 6 and the image of the display 13a perceived by the viewer 8 has the expected curved appearance.

Figure 14:
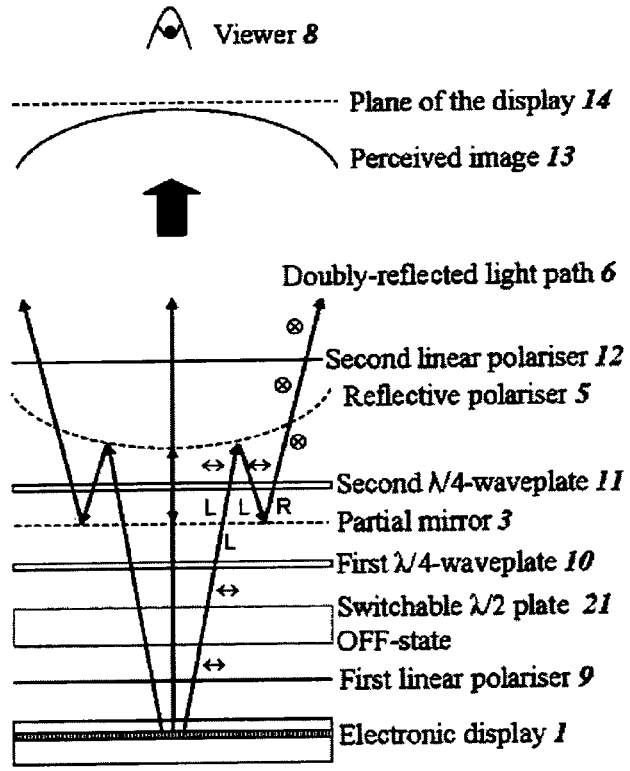
FIGS. 14a and 14b are diagrams illustrating a display constituting a second embodiment of the invention.
Figure 14:
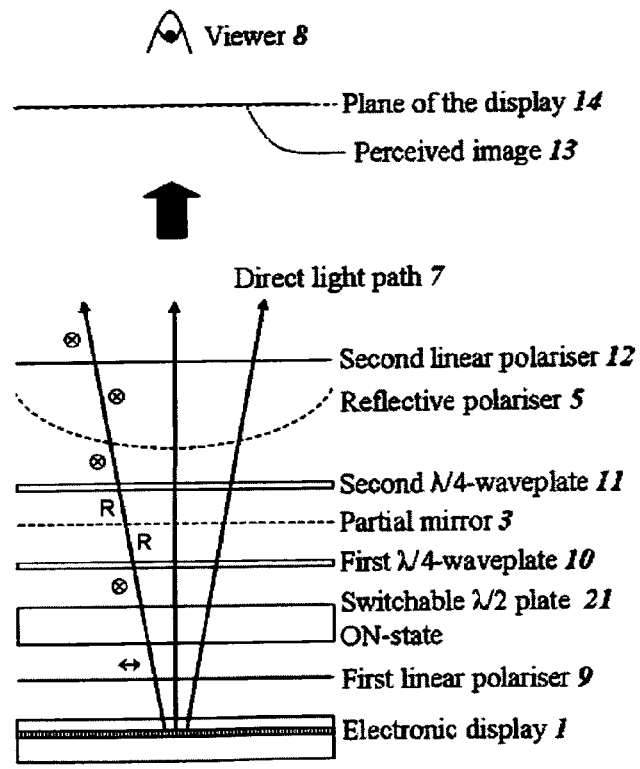

A second embodiment of the invention is shown in FIGS. 14a and 14b. This embodiment provides the capability of optionally utilizing the electronic display 1 as a standard 2D display or as a curved display. For example, such a capability may be of benefit for large-area advertising displays, which may operate like common conventional displays in the 2D mode when displaying text information or common banners but which may take advantage of an enhanced aesthetic appearance by switching to the "curved mode" when trying to catch the attention of viewers for a particular advertising video.

As illustrated in FIGS. 14a and 14b, the system uses the same components as described in the first embodiment. In addition, a switchable half-wave ("switchable λ/2") plate 21 is disposed between the input linear polariser 9 and the first quarter-wave plate 10. Such a switchable half-wave plate 21 may comprise a liquid crystal cell which is capable of being switched on and off electrically. When switched on, the plate 21 acts as a half wave plate but is disablable, i.e. can be switched off so as to provide no substantial retardation.

A half-wave plate introduces a half period phase difference between two polarisation states of light passing through it. If it is oriented correctly, such an element transforms incoming linearly-polarised light with its electric field vector in the plane of the drawing into linearly-polarised light with its electric field vector orthogonal to the plane of the drawing, or vice-versa.

There are a number of well-known methods for making half-wave plates which can be switched on and off electrically using liquid crystal layers. Examples of such cells which are suitable for this application include the TN (twisted nematic) cell, the VAN (vertically aligned nematic) cell, the Freedericksz cell, and the pi cell or OCB (optically compensated birefringence) cell. Other alternative liquid crystal modes may for instance comprise a thicker layer of liquid crystal to operate in the Mauguin region; this has the advantage of giving lower polarisation errors both on-axis and at higher angles, thus reducing potential imaging issues in the system. Such cells are well-known and are disclosed in standard reference publications on liquid crystal displays, such as "*Optics of Liquid Crystal Displays*", by Pochi Yeh and Claire Gu (Wiley Series in Pure and Applied Optics, 1999) and "*Liquid Crystal Displays: Addressing Schemes and Electro-optic Effects*", by Ernst Lueder (Wiley-SID Series in Display Technology, 2001).

FIG. 14a illustrates the operation of the display with the half-wave plate 21 switched off. In this mode of operation, the half-wave plate 21 has no effect on the polarisation state of the light incident upon it. Light emerging from the electronic display 1 therefore follows the same doubly-reflected light path 6 as in the first embodiment. This double reflection that light undergoes and the way in which the reflective polariser 5 is bent causes the light path to be lengthened and the display to appear curved under its true position. This mode of operation corresponds to the curved-appearance mode of the display.

FIG. 14b illustrates the operation of the display with the half-wave plate 21 switched on. Light coming out from the electronic display 1 passes through the linear polariser 9 and becomes linearly-polarised with its direction of polarisation in the plane of the drawing. As the half-wave plate 21 is in its on-state, this linearly-polarised light is rotated by 90° and therefore converted into linearly-polarised light with its electric field vector orthogonal to the plane of the drawing. Light is then changed to right-handed circularly-polarised light by the first quarter-wave plate 10 and is partly transmitted and partly reflected by the partial mirror 3.

The reflected light undergoes a 180° phase change on reflection upon the partial mirror 3 and is converted from left-handed circularly-polarised to linearly-polarised with its direction of polarisation in the plane of the drawing by the bottom quarter-wave plate 10. The half-wave plate 21 rotates this light by 90° once again, changing it therefore to light which is linearly-polarised in a direction orthogonal to the plane of the diagram. This light is then absorbed by the linear polariser 9 which has a transmission axis 15 oriented in a direction parallel to the plane of the drawing.

The transmitted light passes through the second quarter-wave plate 11 and is changed from right-handed circularly-polarised light to linearly-polarised light with its electric field vector orthogonal to the plane of the drawing. This light has now the same polarisation state as that transmitted by both the reflective polariser 5 and the linear polariser 12 and it can therefore pass directly through these two components towards the viewing region. Although the reflective polariser 5 is bent towards the edge of the display, the light undergoes no reflection and reaches the viewer 8 by following the direct light path 7. The display is observed in the same location as the electronic display 1 and appears in its standard 2D-mode.

As mentioned hereinbefore, the order and the orientation of the optical elements may be varied without changing the way in which the display operates. However, even if in principle these variations do not change the performance of the display, in practice some deviations of the components from ideal behaviour may lead to a "best" order of the elements in any specific example.

In addition to those previously described in the first embodiment, alternative orders for the switchable half-wave plate 21 are also possible and may be useful. For example, by reducing the number of times light passes through the switchable half-wave plate 21, the effects of any imperfections in its operation are also reduced. Although all following arrangements are possible, it is preferred for the switchable half-wave plate 21 to be disposed between the linear polariser 9 and the first quarter-wave plate 10 or the first quarter-wave plate 10 and the partial mirror 3 than between the partial mirror 3 and the second quarter-wave plate 11 or the second quarter-wave plate 11 and the reflective polariser 5.

Where a liquid crystal cell is used as the switchable half-wave plate 21, the performance may be improved by the addition of one or more compensation films. For instance, disposing view-angle compensation films above and/or under the cell may improve the viewing-angle properties of the curved-appearance display.

As a more detailed example, liquid crystal cells may have some residual retardance when they are nominally switched 'off', generally when a voltage is applied across a liquid crystal layer of the cell. By way of particular example, a cell which has been designed to be variable between zero retardance and 275 nm retardance may in fact show a residual retardance of order 50 nm when the cell is switched to provide nominally zero retardance. Such residual retardance will cause some visible imaging issues in the system. This may be substantially removed by arranging for the cell to have a retardance of 325 nm in the 'on' state and by providing a 50 nm fixed retarder in series with the switchable liquid crystal cell and with its fast axis perpendicular to that of the cell. The total retardance of the two layers in the 'on' state is then the desired 275 nm and the residual retardance is cancelled to provide zero retardance in the 'off' state. Further, the actual retardance in both states may be adjusted by varying the applied voltages to achieve a desired or optimum performance.

The orientation of some optical elements about an axis perpendicular to the display plane may be varied in order to interchange the states of the switchable half-wave plate 21 dictating the curved-mode and the 2D-mode. For example, rotating either the first quarter-wave plate 10 or the second quarter-wave plate 11 by 90° results in the display of a curved-image when the half-wave plate is switched on and a 2D-image when the half-wave plate is switched off. A similar effect can be obtained by rotating by 90° either the entrance linear polariser 9 or both the reflective polariser 5 and the exit linear polariser 12 together. Although in principle such rotations do not affect the performance of the device, because of deviations of elements from their ideal behaviour or because of wavelength dependence or viewing-angle dependence, one orientation may be preferable to another in practice.

In another implementation of the second embodiment, the partially transmitting mirror 3 is also switchable. It is turned on and acts as a partial mirror when the display is used in curved-mode, so that the essential double reflection occurs. However, it is turned off when the display is used in 2D-mode so that light exiting the device directly is not affected by its partial transmission and the 2D-image can therefore be observed with full brightness. A suitable type of electrically switchable mirror is, for example, disclosed in U.S. Pat. No. 6,961,105.

As mentioned hereinbefore, but also valid to all further embodiments, not only the reflective polariser 5 may be curved. According to the application and in order to generate the desired curved-appearance, at least one of the reflecting layers 3 and 5 has to be bent and not necessarily towards the edge of the display.

Figure 15:
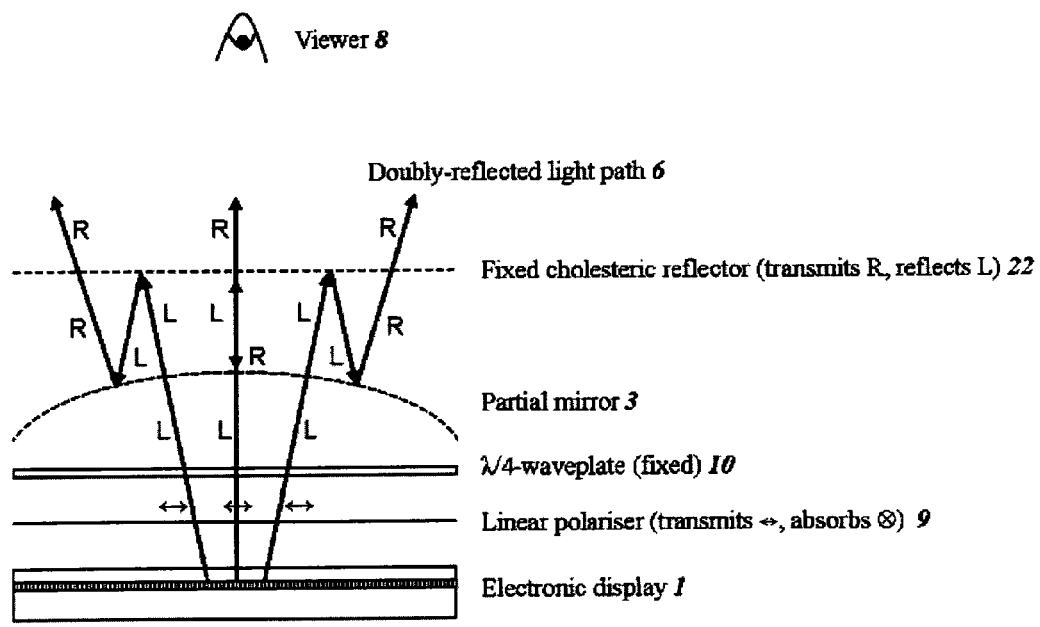
FIGS. 15a and 15b are diagrams illustrating a display constituting a third embodiment of the invention.
Figure 15:
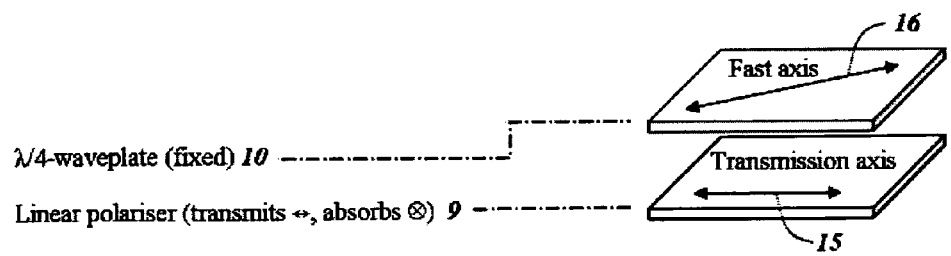

A third embodiment of the invention is illustrated in FIGS. 15*a* and 15*b*. The only element in this embodiment which is not also described in the previous embodiments is a cholesteric reflector 22. This is a liquid-crystal layer with a natural helical structure which causes it to reflect one circular polarisation state while transmitting the other. Such reflectors are well-known and are disclosed in standard books on liquid crystal technology, for example the book by Lueder mentioned previously. Such reflectors may be made so that they may be switched off by the application of an applied electric field, or may simply be fixed and unswitchable. If they are left unswitched, then the liquid crystal layer may be fixed in place by polymerisation of the liquid crystal molecules themselves or by polymerisation of an accompanying monomer.

In the display shown in FIGS. 15*a* and 15*b*, the first partial reflector comprises a partial mirror 3 whereas the second partial reflector comprises a fixed cholesteric reflector 22. This cholesteric layer 22 is left unswitched and chosen so that it reflects, for instance, left-handed circularly-polarised light and transmits right-handed circularly-polarised light. The electronic display 1 is placed beneath a linear polariser 9 with a transmission axis 15 parallel to the plane of the drawing and the quarter-wave plate 10 is oriented with its fast axis 16 at 45° to the transmission axis 15. Other orientations may be given to the optical elements of the display without altering the essential nature of the device.

Light emerging from the electronic display 1 passes through the entrance linear polariser 9 and is linearly-polarised with its electric field vector oriented parallel to the plane of the drawing. Light is then changed into left-handed circularly-polarised light by the quarter-wave plate 10 and hits the partial mirror 3. A portion of the light is transmitted by the partial mirror 3 whereas the other portion is reflected back towards the electronic display 1. The reflected light undergoes a 180° phase change on reflection upon the partial mirror 3 and is then changed into right-handed circularly-polarised light, which is converted by the quarter-wave plate 10 to linearly-polarised light with its electric field vector perpendicular to the plane of the drawing and absorbed by the linear polariser 9. The left-handed circularly polarised light transmitted by the partial mirror 3 is reflected by the fixed cholesteric reflector 22 and goes back onto the partial mirror 3. Once again, a portion of this light is transmitted by the partial mirror 3, converted by the quarter-wave plate 10 to linearly-polarised light with its electric field vector in the plane of the drawing and passes through the linear polariser 9 back into the electronic display 1. The portion of light reflected by the partial mirror 3 undergoes a 180° phase change of its polarisation state. This remaining light is therefore right-handed circularly-polarised and can pass through the fixed cholesteric reflector 22 in the direction of the viewing region.

As the partial mirror 3 is bent towards the edge of the display, the doubly-reflected light path 6 followed by the light reaching the viewer 8 is also longer towards this direction. The image of the display appears curved and below its true position.

In order to provide an additional 2D-mode to the display and to enable switching between a standard 2D-mode and a curved-appearance mode, a switchable liquid crystal cell of the type described in the second embodiment may be added to the optical system. For example, the switchable half-wave plate 21 may be disposed anywhere between the linear polariser 9 and the fixed cholesteric reflector 22.

Figure 16:
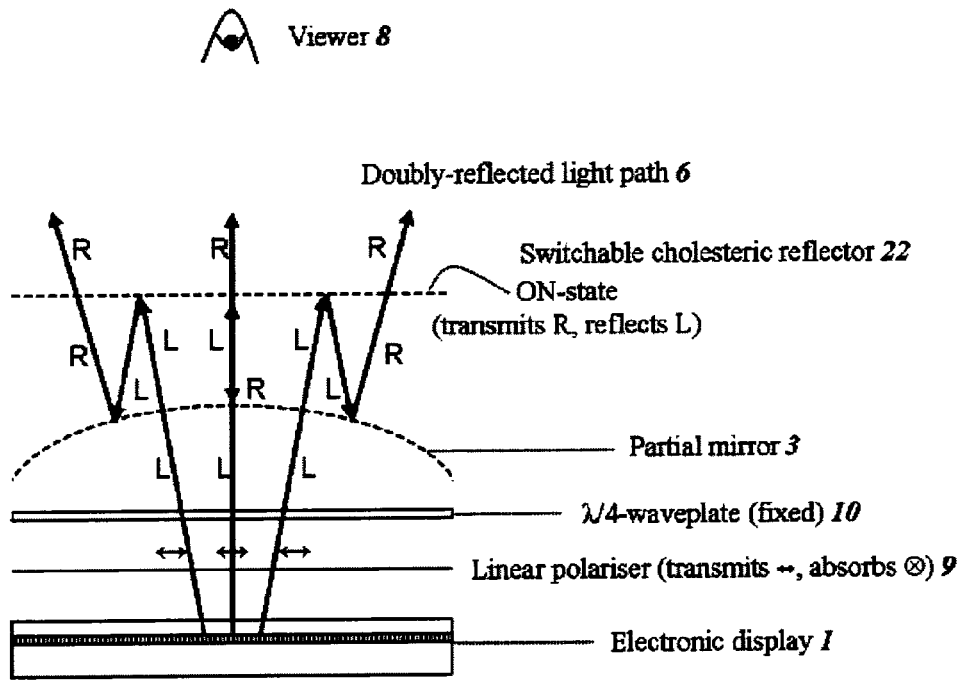
FIGS. 16a and 16b are diagrams illustrating a modified structure and operation of another example of the third embodiment of the invention.
Figure 16:
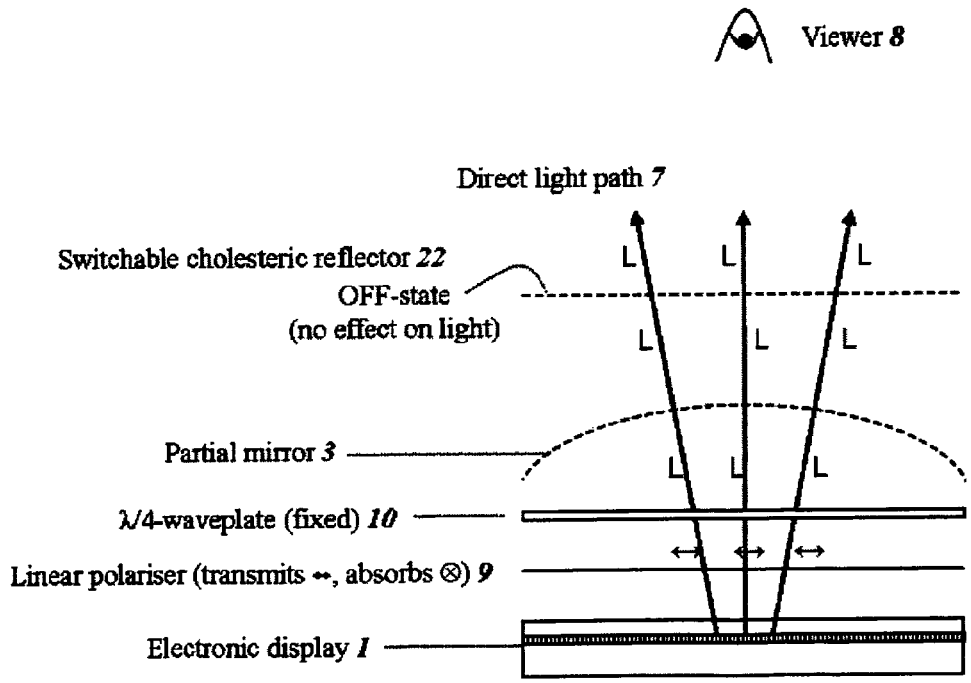

The display illustrated in FIGS. 16*a* and 16*b* differs from that shown in FIGS. 15*a* and 15*b* in that the cholesteric reflector 22 is of the switchable type. When no electric field is applied to it, it is switched 'on' and acts as a fixed cholesteric reflector; for instance left-handed circularly-polarised light is reflected and right-handed circularly-polarised light is transmitted. However, the cholesteric reflector is disablable by applying an electric field so that it has no effect on light and transmits it irrespectively of its polarisation state. By using a switchable cholesteric reflector, the possibility of switching between a standard 2D-mode and a curved-appearance mode is provided without the need for an additional switchable half-wave plate as described hereinbefore.

In the curved-appearance mode, which is illustrated in FIG. 16*a*, the cholesteric reflector is switched on. It reflects left-handed circularly-polarised light and transmits right-handed circularly-polarised light.

Light emerging from the electronic display 1 passes through the entrance linear polariser 9 and is linearly-polarised with its electric field vector oriented in the plane of the drawing. This light is then converted into left-handed circularly-polarised light by the quarter-wave plate 10 before hitting the partial mirror 3. A portion of the light is reflected towards the quarter-wave plate 10 after undergoing a 180° phase change by reflection upon the partial mirror 3 and therefore being converted to right-handed circularly-polarised light. The quarter-wave plate 10 changes this reflected light to linearly-polarised light with its vector perpendicular to the plane of the drawing and this light is absorbed by the entrance linear polariser 9. The light transmitted by the partial mirror 3 towards the cholesteric reflector 22 is left-handed circularly-polarised and is therefore reflected by the cholesteric reflector 22 without any substantial change to its polarisation state. This remaining light hits the partial mirror and is partly transmitted and partly reflected. The transmitted portion is converted by the quarter-wave plate 10 into linearly-polarised light with its electric field vector parallel to the plane of the drawing and goes back into the electronic display 1 as it has the same polarisation state as that transmitted by the linear polariser 9. The reflected portion of the light undergoes a 180° phase change of its polarisation state which therefore becomes right-handed circularly-polarised. It is thus transmitted through the cholesteric reflector 22 to the viewing region. The only light available to the viewer 8 has followed the doubly-reflected light path 6 and, since the partial mirror 3 is bent towards the edge of the display, the light path is also longer towards this direction and the viewer 8 observes an image of the display that appears curved and below its true position.

In the standard 2D-mode, which is shown in FIG. 16*b*, the cholesteric reflector 22 is switched off by the application of an electric field. Light emerging from the electronic display 1 passes through the linear polariser 9 and through the quarter-wave plate 10 before hitting the partial mirror 3. As described hereinbefore, part of the light is reflected and lost within the system, while the other part is transmitted towards the cholesteric reflector 22, which in its off-state transmits light irrespective of its polarisation state. Thus, light exits the optical system and reaches the viewer 8 via a direct light path 7. Although the partial mirror 3 is bent towards the edge of the display, no reflection within the system occurs and a displayed image is perceived in its standard 2D-mode as emanating substantially from the actual location of the image-producing plane of the electronic display 1.

Figure 17:
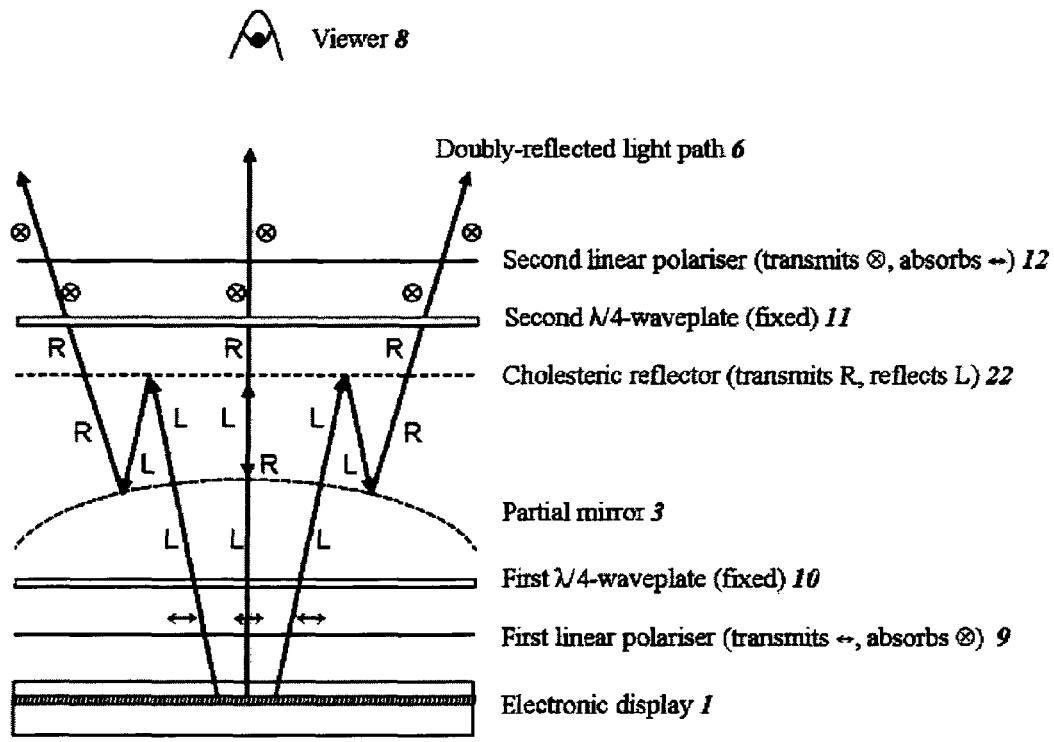
FIGS. 17a and 17b are diagrams illustrating a further modified structure and operation of a further example of third embodiment of the invention.
Figure 17:
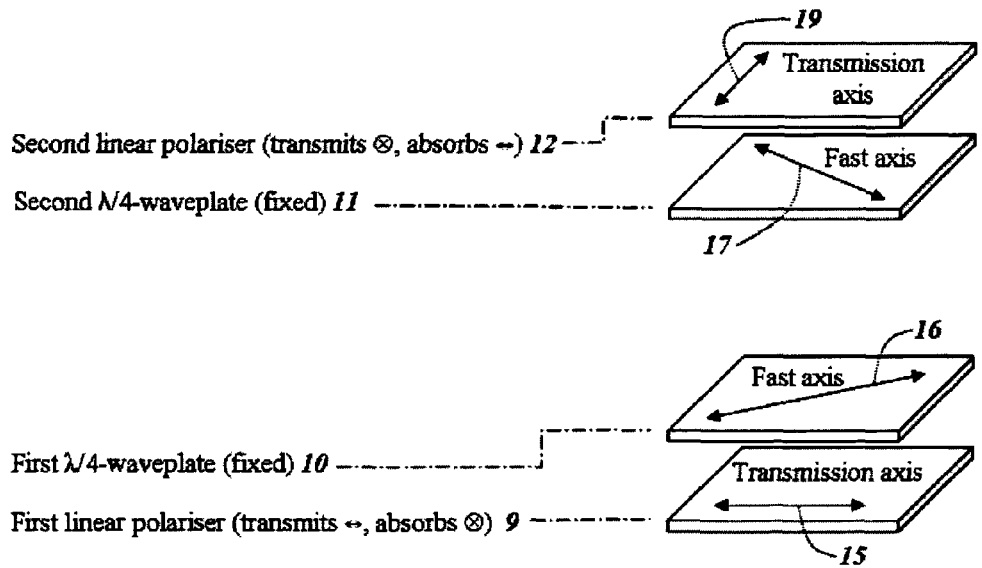

Display devices which output circularly-polarised light may suffer from reduced contrast. In order to correct for this limitation, a second quarter-wave plate 11 and an exit linear polariser 12 may be added on top of the cholesteric reflector 22, which is of the fixed or switchable type, to transform the circularly-polarised light into linearly-polarised light. An example of this alternative implementation is shown in FIGS. 17a and 17b. The second quarter-wave plate 11 is oriented with its fast axis 17 orthogonal to the fast axis 16 of the first quarter-wave plate 10 and the exit linear polariser 12 has its transmission axis 19 perpendicular to the plane of the drawing. Although adding those two components 11 and 12 to the optical system may in principle improve the performance of the display, one configuration may be preferable to the other in any application example.

FIGS. 15a to 17b show a curved-appearance display in which the partial mirror 3 is bent towards the edge of the display. The same curved appearance effect may also be obtained by modifying the shape of the cholesteric reflector 22 instead of the partial mirror 3. As in the case of all embodiments of this invention, according to the application and in order to generate the desired curved-appearance, at least one of the reflecting layers has to be bent and not necessarily towards the edge of the display.

The use of partial reflectors results in a large brightness loss within the system. In theory, if the brightness of the electronic display 1 combined with the linear polariser 9 is 100%, then the brightness of the device described in the first embodiment is only 25% due to the way in which the device operates.

Figure 18:
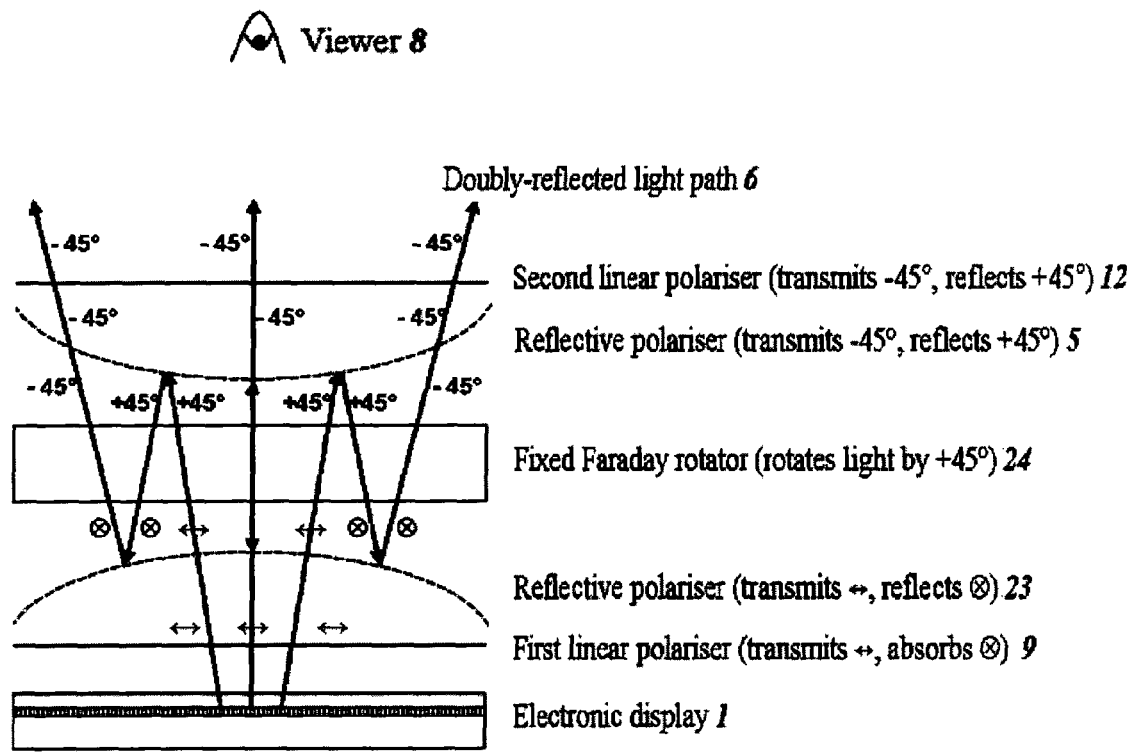
FIGS. 18a and 18b are diagrams illustrating a display constituting a fourth embodiment of the invention.
Figure 18:
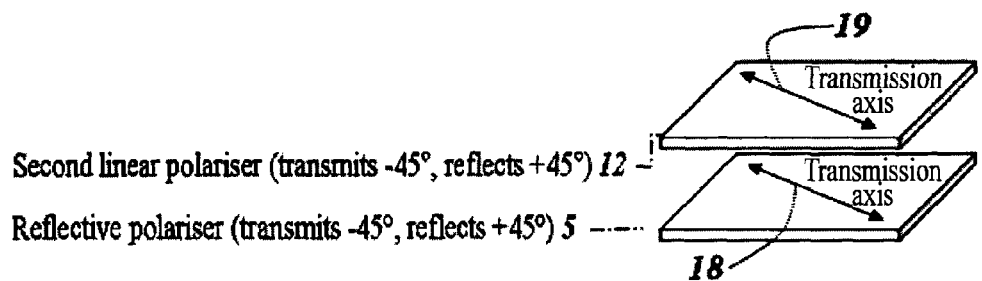
Figure 18:
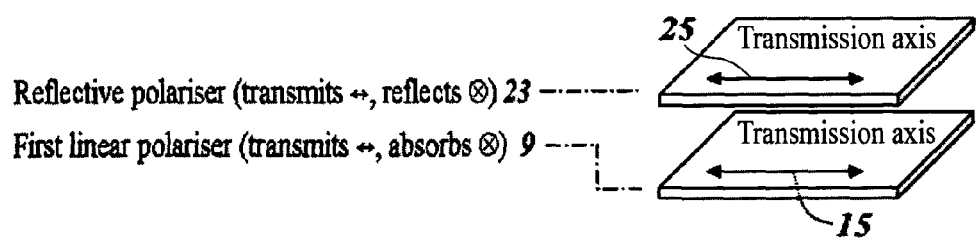

The fourth embodiment of the invention is shown in FIGS. 18a and 18b and comprises a device which may provide a substantial improvement to the efficiency of light utilisation and hence a substantial increase to the overall brightness of the curved-appearance display.

The display described in this embodiment differs from the previously described displays in that the optical arrangement in front of the electronic display 1 comprises two reflective polarisers 23 and 5, between which is disposed a fixed Faraday rotator 24. An entrance linear polariser 9 is disposed below the reflective polariser 23 and an exit linear polariser 12 is disposed above the reflective polariser 5. For example, the transmission axes 15 and 25 of the linear polariser 9 and the reflective polariser 23 are parallel to each other and oriented in the plane of the drawing, whereas the transmission axes 18 and 19 of the reflective polariser 5 and the linear polariser 12 are parallel to each other and oriented at −45° with respect to the transmission axes 15 and 25. The Faraday rotator rotates the polarisation of linearly-polarised light by +45° upon passage of the light in either direction through the rotator 24.

Both linear polarisers 9 and 12 are not necessary to the good operation of the system and their presence does not change the essential nature of the system. For example, another implementation of the display may omit either or both of these two absorbing polarisers 9 and 12 but still perform the same function. In principle, these variations do not change the performance of the display but, in practice, one arrangement may be preferable to another.

The Faraday rotator 24 comprises layers of material which rotates the polarisation state of light passing therethrough by an angle proportional to the magnetic field applied to the layers. The principle of operation of such devices is well-known and described in standard reference texts, for example *Optics* by E. Hecht and A. Zajac, fourth edition, Addison Wesley, 2003.

An important difference between Faraday rotators and other elements which rotate the polarisation state of light is that Faraday rotators are non-reciprocal. In other words, if a beam of light is sent through a Faraday rotator onto a mirror and then returns through the Faraday rotator, its polarisation is rotated by a total of 2θ, where θ is the angle of rotation caused by one pass through the Faraday rotator. This contrasts with optically active materials such as chiral liquid crystals, where the net result after two passes through the material and one reflection would be no change in the polarisation state.

As illustrated in FIGS. 18a and 18b, light emerging from the electronic display 1 passes through the entrance linear polariser 9 and is linearly-polarised with its electric field vector in the plane of the drawing. The transmission axes 15 and 25 of the linear polariser 9 and the lower reflective polariser 23 are also oriented parallel to the plane of the drawing so that light reaches the fixed Faraday rotator 24. The plane of polarisation is then rotated by +45° by the Faraday element 24, causing the light to reflect from the upper reflective polariser 5. In its second pass through the Faraday rotator 24, the plane of polarisation of the reflected light is rotated by a further +45° and so emerges with its electric field vector oriented perpendicular to the plane of the drawing so that the light is then reflected by the lower reflective polariser 23 and passes again through the Faraday rotator 24, which rotates the polarisation plane by a further +45° so that the electric field vector of the remaining light is oriented at −45°. Light is finally transmitted through the upper reflective polariser 5 and the exit linear polariser 12.

Light which reaches the viewer 8 therefore follows the doubly-reflected light path 6. As both reflective polarisers 23 and 5 are bent towards the edge of the display, the doubly-reflected light path 6 is also longer towards that direction and the viewer 8 sees the display with a curved appearance.

As mentioned hereinbefore, the display described above may be made switchable between a curved-appearance mode and a standard 2D-mode by introducing a switchable half-wave plate 21 within the optical system. An example of such an alternative implementation is illustrated in FIGS. 19a and 19b.

As an example, the switchable half-wave plate is disposed between the Faraday rotator 24 and the upper reflective polariser 5. However, it may be placed between the lower reflective polariser 23 and the Faraday rotator 24 and would still perform the same function. When switched on, the half-wave plate 21 has a fast axis 26 which is perpendicular to the transmission axis 25 of the lower reflective polariser 23.

Figure 19:
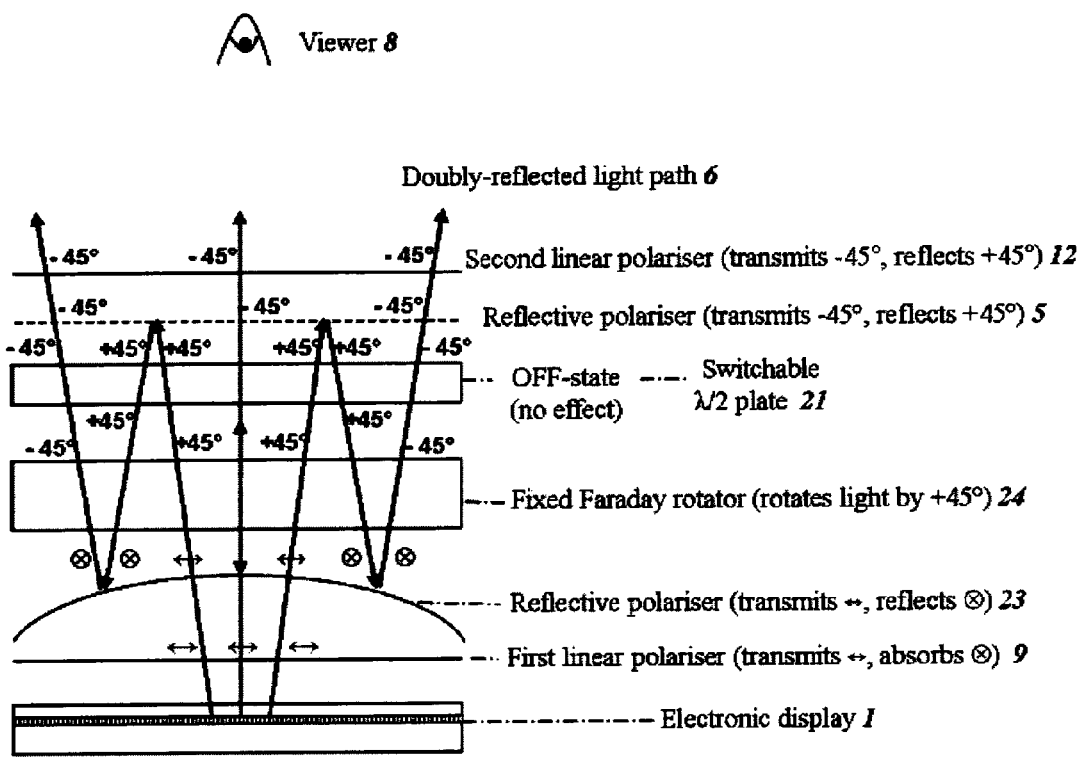
FIGS. 19a and 19b are diagrams illustrating a modified structure and operation of another example of the fourth embodiment of the invention.
Figure 19:
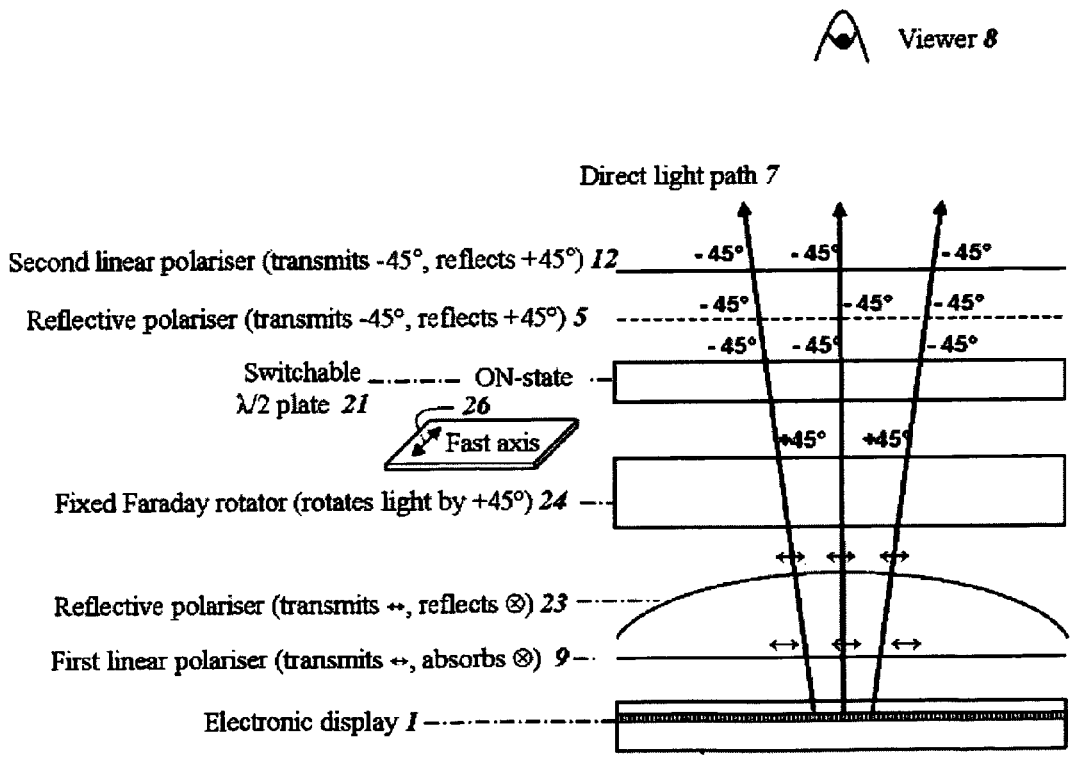

Operation of the display in its curved-appearance mode is shown in FIG. 19a. The half-wave plate 21 is switched off and has substantially no effect on the polarisation state of the light passing through it. The display therefore operates similarly to the display of FIGS. 18a and 18b. Light follows the doubly-reflected path 6 and an image with curved-appearance is observed by the viewer 8.

FIG. 19b illustrates operation in the standard 2D-mode. In this mode, the half-wave plate 21 is switched on. Light emerging from the lower reflective polariser 23 with its electric field vector oriented in the plane of the drawing passes through the Faraday rotator 24, which rotates the plane of polarisation so that the electric field vector is oriented at +45°. The half-wave plate 21 further rotates the plane of polarisation by 90° such that light emerging from it has its electric field vector oriented at −45°. This light is transmitted by the upper reflective polariser 5 and by the exit linear polariser 12 towards the viewing region. Light which reaches the viewer 8 thus follows the direct light path 7 and the displayed image is observed as a standard 2D-image in the plane of the electronic display 1.

An advantage of this arrangement is that it provides substantially full-brightness images in any mode of operation. In practice, some losses will occur as light passes through or is reflected by the various optical elements. However, no attenuation takes place because of the intended operation of the optical elements.

Figure 20:
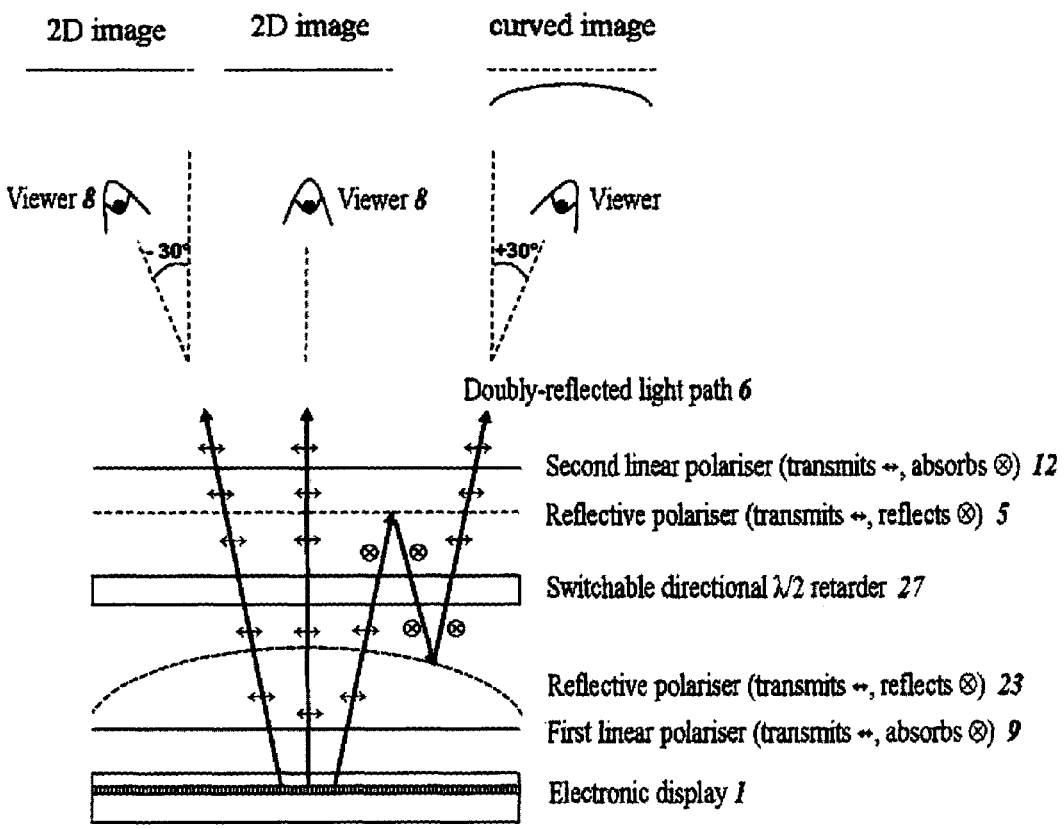
FIGS. 20a and 20b are diagrams illustrating a display constituting a fifth embodiment of the invention.
Figure 20:
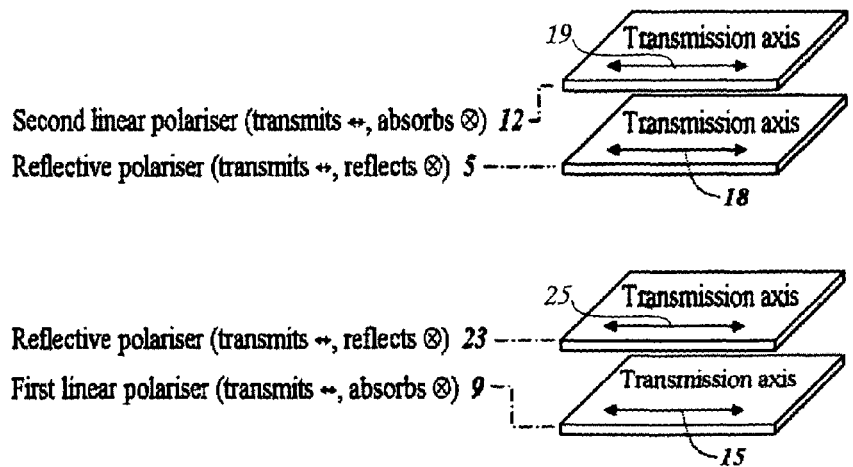

A fifth embodiment of the invention is illustrated in FIGS. 20a and 20b. These drawings also illustrate a modification to the device, which may provide a substantial improvement to the efficiency of light utilisation and hence a substantial increase to the overall brightness of the curved-appearance display.

The display of this embodiment differs from the previously described embodiments in that the optical arrangement disposed in front of the electronic display 1 comprises two reflective polarisers 23 and 5 as the partial reflectors and a switchable directional half-wave (λ/2) retarder 27. The reflective polarisers 23 and 5 are arranged to transmit light whose electric field vector is oriented in the plane of the drawing and to reflect the orthogonal polarisation state. The switchable directional retarder 27 is switchable between an 'off'-state, in which it has substantially no effect on the polarisation of light passing through it, and an 'on'-state. Such an element may, for instance, comprise a switchable liquid crystal cell which acts in the 'on'-state as a half-wave plate for light travelling in a direction inclined at +30° to the display plane normal. The directional retarder 27 has substantially no effect on the polarisation of light rays travelling at other angles and particularly at −30° to the display plane normal. Details of how such direction-dependent wave plates may be constructed using liquid crystal materials and how they operate are disclosed in GB2405516. The use of such a switchable directional half-wave retarder 27 enables the possibility of switching between a 2D-mode observed at all angles and a curved-mode observed only at angles close to +30°.

As in the previous embodiment, an entrance linear polariser 9 is disposed below the reflective polariser 23 and an exit linear polariser 12 is disposed above the reflective polariser 5. For example, the transmission axes 15 and 25 of the linear polariser 9 and the reflective polariser 23 are parallel to each other and oriented in the plane of the drawing, and so are the transmission axes 18 and 19 of the reflective polariser 5 and the linear polariser 12. Both linear polarisers 9 and 12 are not necessary to the good operation of the system and their presence does not change the essential nature of the system. For example, another implementation of the display may omit either or both of these two absorbing polariser 9 and 12, but still perform the same function. In principle, these variations do not change the performance of the display but, in practice, one arrangement may be preferable to another.

FIGS. 20a and 20b illustrate operation of the display in a curved-appearance mode with the directional retarder 27 switched on. Viewing conditions must be such that viewers observe the display at an angle close to +30°. Light emerging from the electronic display 1 is linearly-polarised by the linear polariser 9. Light is polarised with its electric field vector in the plane of the diagram and passes through the reflective polariser 23.

As shown at the right by the light path 6 in FIG. 20a, when considering light beams at an angle close to +30°, the directional half-wave retarder 27 rotates the polarisation of the light passing through it by 90° so that the electric field vector becomes perpendicular to the plane of the drawing. This light is then reflected from the upper reflective polariser and travels back down towards the electronic display 1 at an angle close to −30° to the normal plane. Its polarisation state is therefore unaffected by the directional half-wave retarder 27 and it is then reflected again by the lower reflective polariser 23. Travelling back towards the viewer 8 at an angle of +30°, its plane of polarisation is again rotated by the directional half-wave retarder 27 and can therefore pass through the upper reflective polariser 5 and the exit linear polariser 12. The resulting light emerges from the display towards the viewer 8 at an angle of +30°. Because of the doubly-reflected light path 6 and of the curved-shape given to the reflective polariser 23, the optical light path is longer towards the edge of the display and the display is observed with a curved appearance.

For light which emanates from the electronic display 1 at angles different from +30° when the directional retarder 27 is switched on and for light emerging at all angles when the directional retarder 27 is switched off, an image in its standard 2D-mode is observed. As shown for light paths in the middle and left of FIG. 20a, the directional half-wave retarder 27 has no effect on the polarisation state of light passing through it. Thus, the light emerging from the electronic display 1 and passing through the linear polariser 9 and the lower reflective polariser 23, also passes through the upper reflective polariser 5 and the linear polariser 12. Light therefore travels directly through the entire system without being reflected and, although the lower reflective polariser 23 is bent towards the edge of the display, the image of the display is seen by the viewer 8 as a standard flat 2D-image.

As in the previous embodiment, an advantage of this fifth embodiment is that it also operates at substantially full brightness. Light is not lost because of the operation of the various optical elements and the displayed images are therefore relatively bright in both the curved-appearance mode and the 2D-mode. In practice, some losses will occur as light passes through or is reflected by the various elements. However, no attenuation takes place because of the intended operation of the optical elements, such as for example the intrinsic nature of the partially transmitting mirror described in the first embodiment.

Figure 21:
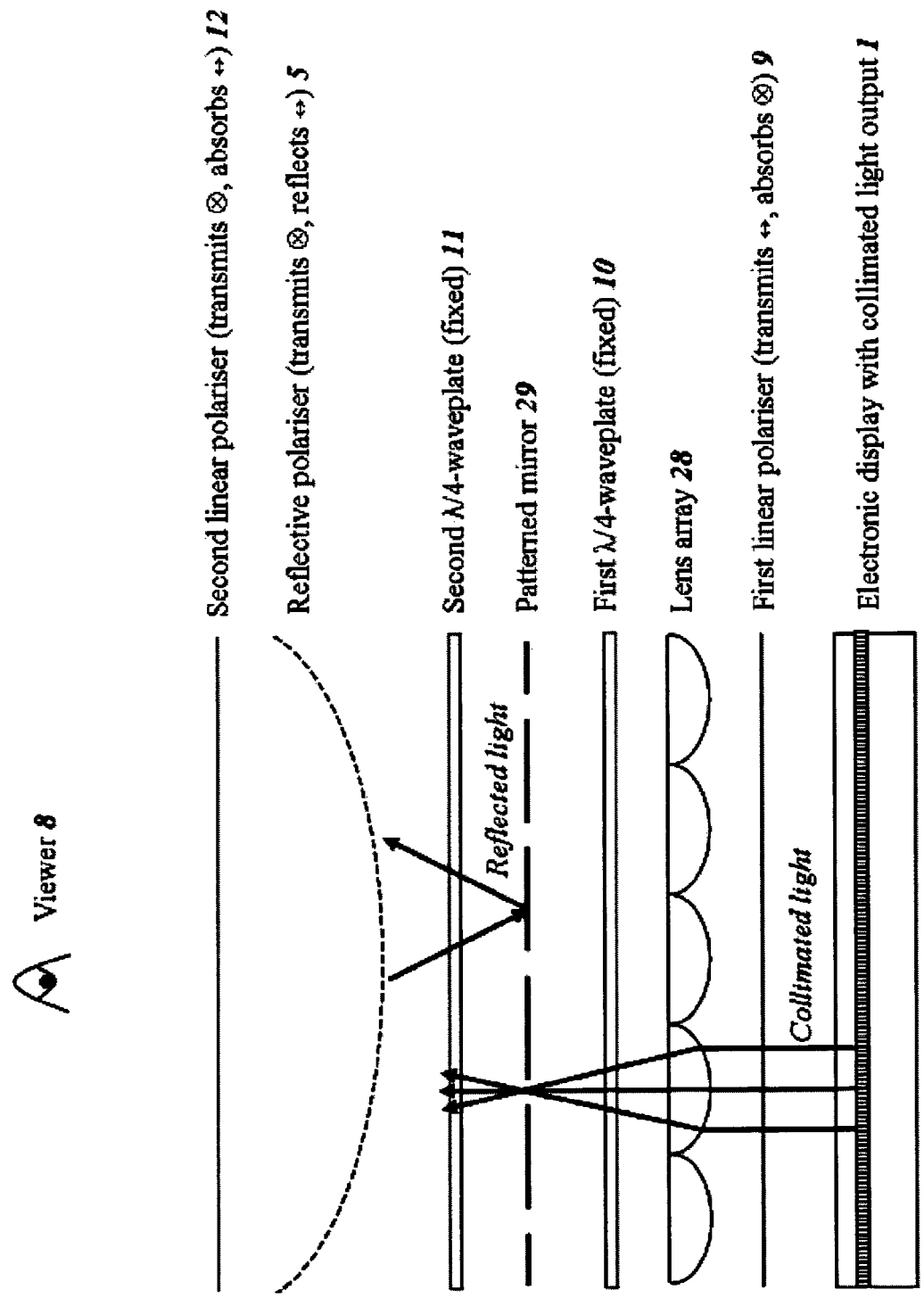
FIG. 21 is a diagram illustrating a display constituting a sixth embodiment of the invention.

A sixth embodiment of the invention is illustrated in FIG. 21. A disadvantage of the way the curved appearance of the display is obtained in some embodiments is that partial reflectors which generate a large brightness loss within the system are used. In theory, if the brightness of the electronic display 1 combined with the linear polariser 9 is 100%, then the brightness of the device described in the first embodiment is only 25% due to the fundamental way in which the device operates.

This sixth embodiment illustrates a modification to the device, which may provide a substantial improvement to the efficiency of light utilisation and hence a substantial increase to the overall brightness of the curved-appearance display. In this embodiment, a lens array 28 is used together with a display with collimated light output 1 and a highly reflective patterned mirror 29. The patterned mirror 29 is designed such that it is predominantly reflective with small transparent regions. The patterned mirror 29 is designed to be substantially in the focal plane of the lens array.

As illustrated in FIG. 21, the relatively collimated light from the electronic display 1 emerges substantially normally to the image plane and passes through the linear polariser 9 before hitting the lens array 28. The lenses in the array are designed to focus the light through the transparent regions of the patterned mirror 29. This system thus produces a high transmission of light through the patterned mirror 29. Light reflected from the reflective polariser 5 is incident on the patterned mirror 29. Since the patterned mirror 29 is predominantly reflective, high reflectivity can be achieved.

The rest of the system works in a similar manner to the previous embodiments. An image with curved appearance is generated due to the double reflection of light within the system and the curved-shape given to at least one of the reflective layers.

In the case of an LCD used as the electronic display 1, light exiting the display is already linearly-polarised and the polariser 9 can be omitted from the system. Assuming the collimated light from the electronic display 1 is transmitted through the patterned mirror 29 with an efficiency of 90% and reflected from the same patterned mirror 29 with an efficiency of 90%, the brightness of the curved image would increase from 25% to 80%.

Lenses of the array element 28 may be spherically converging lenses or cylindrically converging lenses. However, optical parameters of the lenses are chosen such that incoming collimated light from the electronic display 1 is focused through the holes in the patterned mirror 29. For example, the lens array 28 may comprise an array of cylindrical or square lenses. What is important is that the lens system 28 is designed to focus light through the apertures of the patterned mirror 29.

The display may be operated in any of the ways described hereinbefore, such as with at least one of the reflective layers bent and not necessarily towards the edge of the display, in order to generate the desired curved-appearance according to the application. Again, a switchable half-wave plate 21 may be introduced within the optical system in order to enable the switching between standard 2D-images and curved-appearance images and some re-ordering and re-orientation of the optical elements are possible without altering the essential nature of the device.

Figure 22:
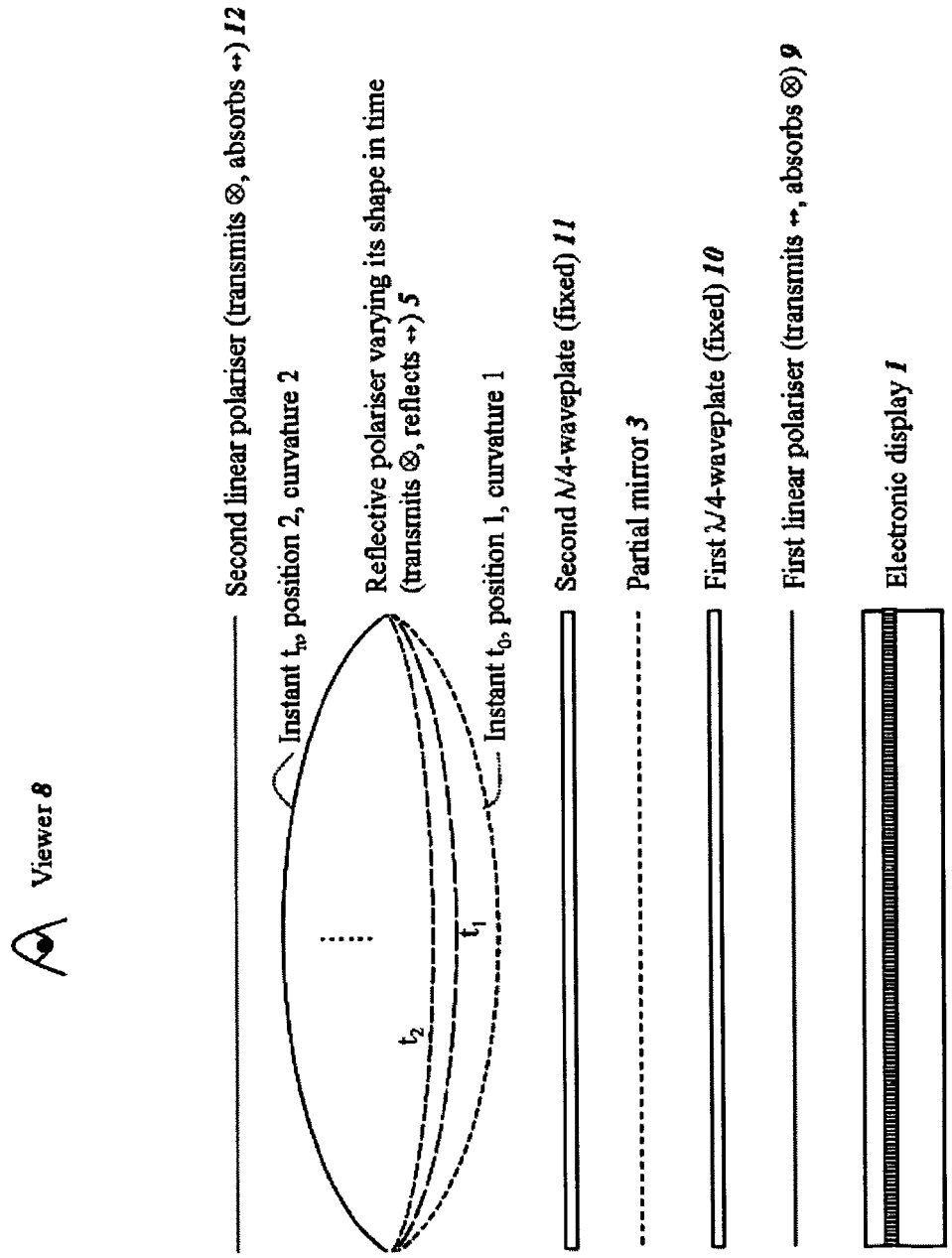
FIG. 22 is a diagram illustrating a display constituting a seventh embodiment of the invention.

FIG. 22 shows a seventh embodiment of the invention, in which the display is of the same general type as that described in previous embodiments but providing a curved image whose appearance varies in time. At least one of the reflective layers 3 and 5 is of controllable variable shape. For example, at least one of the reflective layers 3 and 5 may be bent towards the edge of the display at the instant $t_o$ and bent in the opposite direction at the instant $t_n$. The oscillation with time of the reflective films 3 and 5 may be controlled by means of piezoelectric actuators or a piezoelectric film stuck onto the reflective layer and to which an appropriate electric field is applied.

In a particular example of this embodiment, the curved shape given to the reflective polariser 5 may be varied in time as shown in FIG. 22. The controlled oscillation may be such that the reflective polariser 5 oscillates quickly from position 1, with curvature 1 at the instant $t_o$ to position 2, with curvature 2 at the instant $t_n$, both positions being different and describing different curvature-shapes and thus providing intermediate positions and curvatures at intermediate times.

For instance, a display operating in such way may be of interest for enhancing the aesthetic appearance of advertising displays by varying in time the curved appearance of the displayed image. The slow-motion of the curved-appearance of the display may for instance be an important appealing effect.

Figure 23:
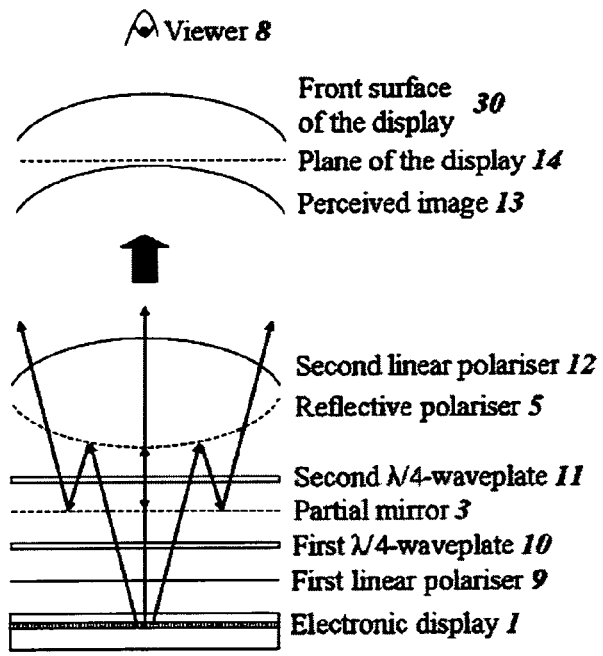
FIGS. 23a and 23b are diagrams illustrating a display constituting an eighth embodiment of the invention.
Figure 23:
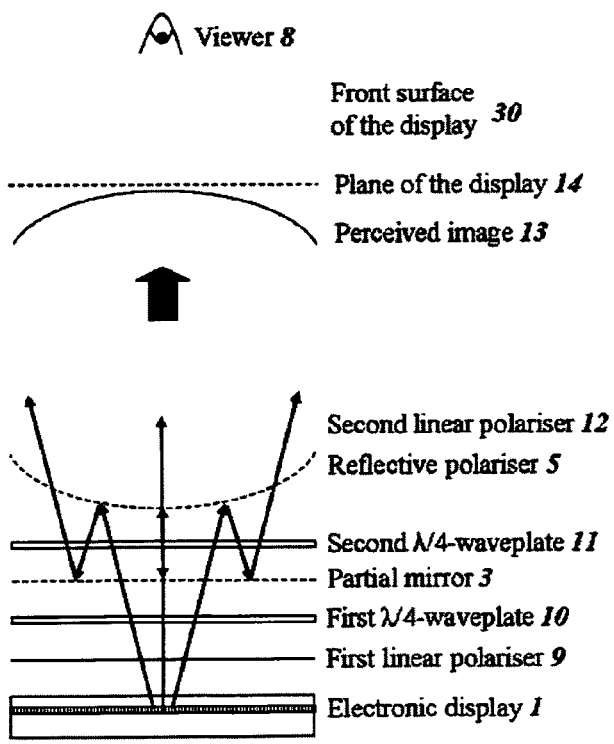

An eighth embodiment of the invention is illustrated in FIGS. 23a and 23b. The display differs from that described in previous embodiments in that the front linear polariser 12 is also curved in a particular shape. This variation does not change either the way in which the display operates or its performance, but it provides enhanced aesthetics to the display itself.

FIGS. 23a and 23b show a virtually curved-appearance display where the partial mirror 3 is flat and parallel to the plane of the electronic display 1 while the reflective polariser 5 is bent towards the edge of the display. Such an arrangement produces an image of the display that appears convex and below its true position to the viewer 8.

As shown in FIG. 23a, the front linear polariser 12 may for example be curved in the opposite direction to the reflective polariser 5, i.e. in a convex manner as seen by the viewer 8. In this case, the perceived image 13 of the display and the front surface of the display 30 would follow the same curved-shape. However, the curved image would not be displayed in the plane of the linear polariser 12. Such perceived effect may for instance be desirable for automotive applications, particularly dashboard displays, which are requesting displays to follow the curved lines of the car interior.

Another example shown in FIG. 23b comprises a display in which the front linear polariser 12 has the same curvature as the reflective polariser 5. Such an arrangement produces the perceived image 13 of the display and the front surface of the display 30 curved in opposite directions. Such perceived effect may be unusual and surprising to the viewer 8 and may thus for instance find application in advertising displays as an enhanced eye-catching effect.

Figure 24:
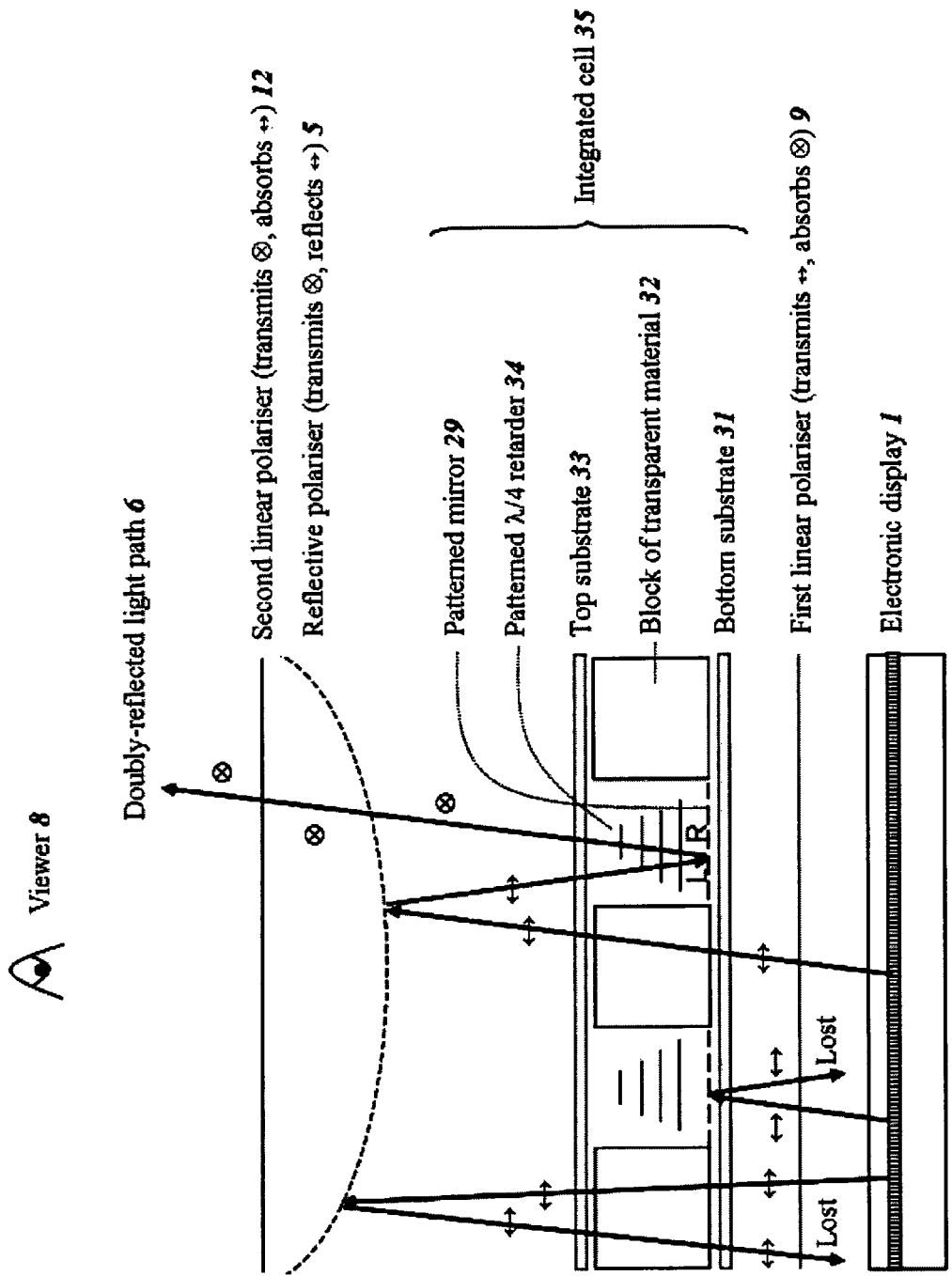
FIG. 24 is a diagram illustrating a display constituting a ninth embodiment of the invention.

FIG. 24 illustrates a ninth embodiment of the invention, in which the display is of the same general type as that described in the first embodiment, but where the quarter-wave function of 10 and 11 and the partial mirror function of 3 in FIGS. 8a and 8b are integrated together in a single integrated cell 35.

A patterned mirror 29 is designed such that it partially transmits light through small transparent regions and partially reflects light incident upon highly reflective regions. The patterned mirror 29 design is optimised in order to avoid fringe problems and to enable alignment of a liquid crystal layer on it.

As shown in FIG. 24, the patterned mirror 29 is disposed between a bottom substrate 31 and a top substrate 33, which may be glass or plastic substrates. A patterned quarter-wave retarder 34 is then disposed on all highly reflective regions of the patterned mirror 29, while blocks of transparent material 32 are disposed on all transparent regions of the patterned mirror 29. For example, the patterned quarter-wave retarder 34 may be a fixed liquid crystal layer and each block of transparent material 32 inside the cell may be a polymer wall whose height is such that the thickness of the liquid crystal region corresponds to a quarter-wave plate.

Light emerging from the electronic display 1 passes through the entrance linear polariser 9 and is polarised with its electric field vector in the plane of the drawing. A portion of light hits the reflective region of the patterned mirror 29 and is reflected back through the electronic display 1, while the other portion is transmitted through the transparent regions of the patterned mirror 29 and through the block of transparent material 32. Transmitted light is then reflected by the reflective polariser 5 back towards this integrated cell 35. A portion of this reflected light passes directly through the transparent regions of the cell 35 and is lost within the system. The other portion first passes through the patterned quarter-wave retarder 34, which converts light from linearly-polarised to left-handed circularly-polarised. It is then reflected by the patterned mirror 29, which imparts a 180° phase change to its polarisation state, converting it into right-handed circularly-polarised light. This light travels back through the patterned quarter-wave retarder 34 to exit the integrated cell 35 with its polarisation state oriented perpendicular to the plane of the drawing. This light is then transmitted by the reflective polariser 5 and the exit linear polariser 12 and reaches the viewer 8.

As for previous embodiments, the combination of the doubly-reflected light path 6 and the curved-shape given to the reflective polariser 5 produces an image of the display which appears curved to the viewer 8.

Using such an integrated cell 35 has the advantage of reducing the number of optical components within the system and therefore may have an influence on manufacturing cost. It also reduces the number of times light has to pass through a retarder and therefore may help to reduce potential imaging issues due to polarisation errors.

Figure 25:
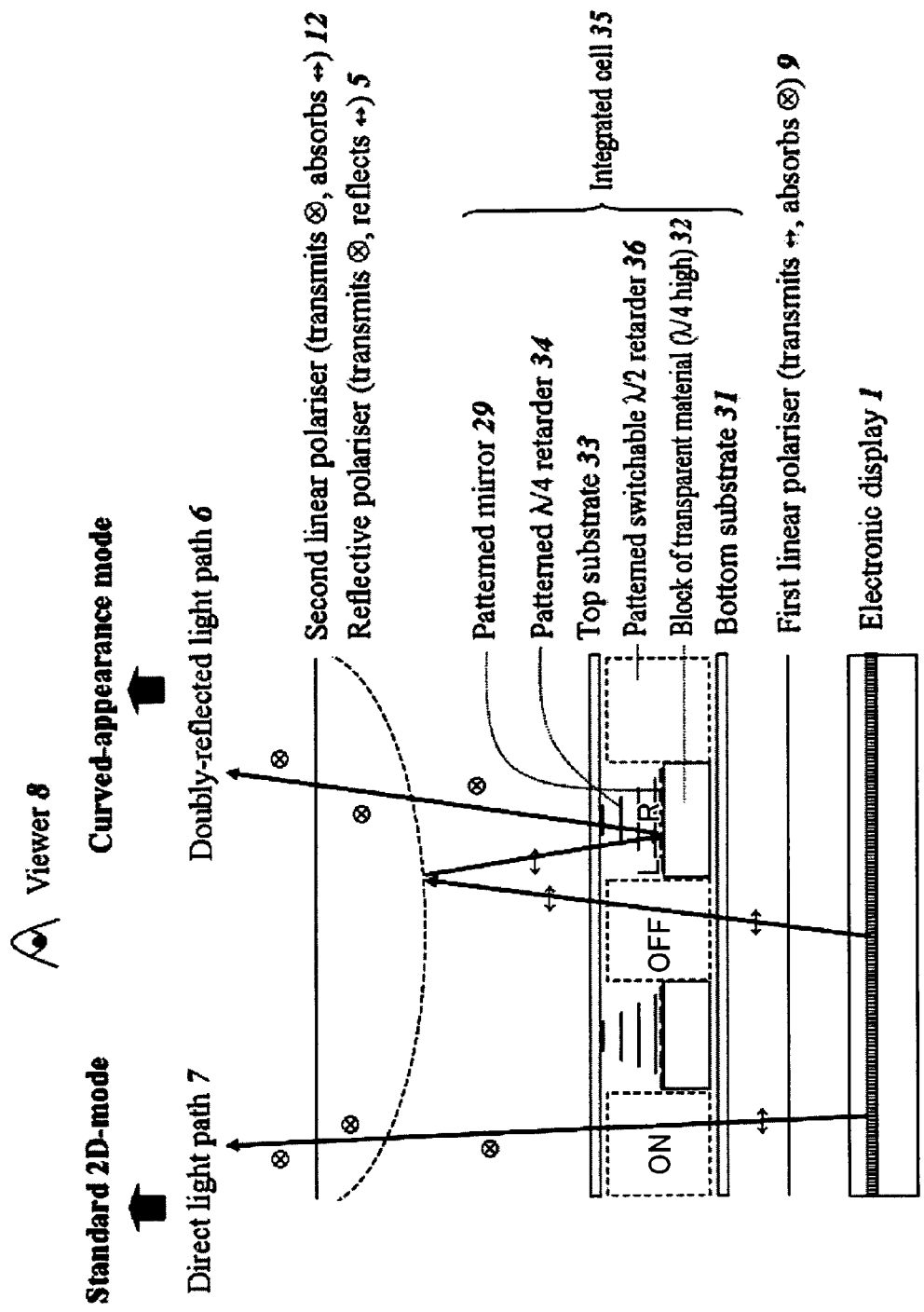
FIG. 25 is a diagram illustrating a modified structure of another example of the ninth embodiment of the invention.

FIG. 25 illustrates an alternative implementation of the ninth embodiment of the invention in order to enable switching between a standard 2D-mode and a curved-appearance mode. Such an arrangement uses a slightly modified structure of the integrated cell 35. In this case, the transparent material regions in FIG. 24 are replaced by a patterned switchable half-wave retarder 36 and blocks of transparent material 32 are disposed under the reflective regions of the patterned mirror 29.

In the curved-appearance mode shown on the right-hand side of the drawing, the half-wave retarder regions 32 are switched off and light follows the same doubly-reflected light path 6 as previously described for FIG. 24.

In the standard 2D-mode shown on the left-hand side of the drawing, the half-wave retarder regions 32 are switched on. Light emerging from the linear polariser 9 with its electric field vector parallel to the plane of the drawing is rotated by 90° and converted into linearly-polarised light with its electric field vector perpendicular to the plane of the drawing. This polarisation state of light is transmitted by the reflective polariser 5 and the linear polariser 12 and can therefore exit the system. The viewer 8 sees light that has followed the direct light path 7 and a displayed image is perceived as emanating substantially from the actual location of the image-producing plane of the electronic display 1. A standard 2D-image is thus observed in the viewing region.

Patterned retarders, such as the retarder 34 shown in FIG. 24 and the retarder 36 shown in FIG. 25 may be made in a variety of ways and several of these are illustrated in FIGS. 26a to 26d.

Figure 26:
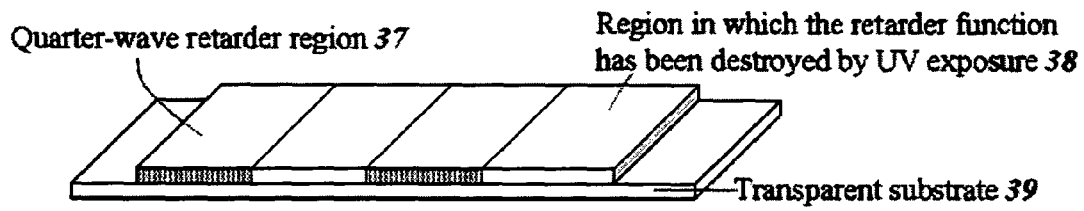
FIGS. 26a to 26d are diagrams illustrating examples of an optical element of the display of FIG. 25.
Figure 26:
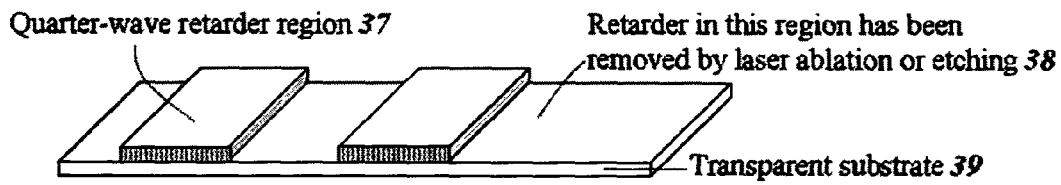
Figure 26:
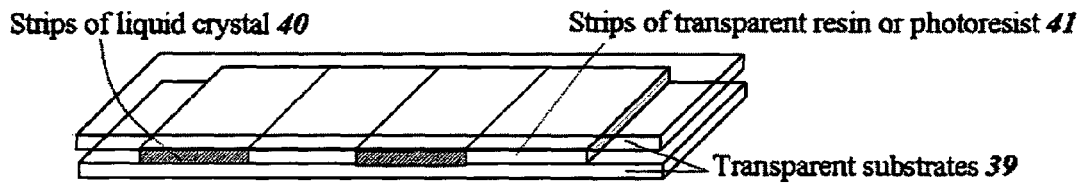
Figure 26:
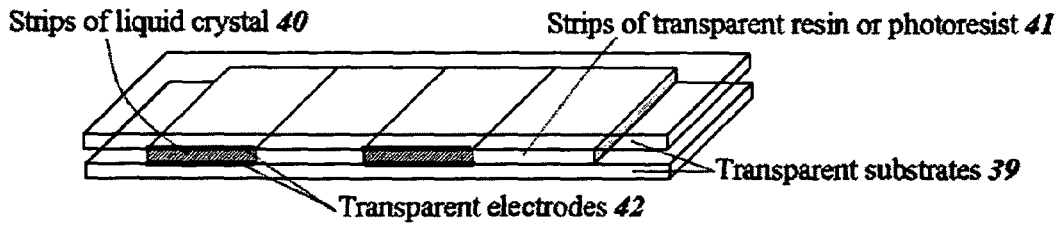

For example, as shown in FIG. 26a, the retarder function may be destroyed in regions which are required to provide no retardation function. Although FIG. 26a refers to quarter-wave retarders, the same principals may be used for half-wave or other retarders. Thus, regions such as 37 retain their retarder function whereas regions such as 38 have the retarder function destroyed, for example by exposure to ultraviolet (UV) radiation. Thus, an initially uniform retarding layer is formed on a transparent substrate 39 and is then exposed to ultraviolet irradiation via a suitable mask to provide the patterned retarder. As an alternative, the regions which are required not to have a retarder function may be removed as illustrated in FIG. 26b. Examples of methods of removing the retarder material include etching, photolithographic development and laser machining.

Patterned retarders may also be formed using liquid crystal materials and a first example is illustrated in FIG. 26c. The patterned retarder is formed between transparent substrates 39 and comprises strips of liquid crystal material 40 interlaced or alternating with strips of a transparent resin or photoresist material 41. The facing surfaces of the transparent substrates 39 are provided with appropriate alignment layers in order to align the birefringence axes in the desired direction. Such alignment layers (not shown) may be of any suitable type and the alignment direction may be provided by a known alignment layer rubbing process or any other suitable technique.

Where the patterned retarder is required to rotate the linear polarisation electric field vector of light, a polarisation-rotating arrangement may be used instead of a retarder. For example, the liquid crystal material 40 and the adjacent alignment layers may be arranged to provide a twisted nematic cell for providing polarisation rotation of 90° or of any other desired angle of rotation.

For the patterned half-wave retarder 36 in FIG. 25, the patterned layer may need to be switchable between a mode which rotates the polarisation state and a mode which leaves it unaffected. In this case, the transparent substrates 39 are provided with patterned transparent electrodes 42, for example made of indium tin oxide (ITO), as illustrated in FIG. 26d. A liquid crystal layer 40 is provided between alignment layers formed on the electrodes. The liquid crystal mode employed by the device is such that, when no voltage is applied between the patterned electrodes 42, the liquid crystal cell acts as a patterned half wave or other retarder. When a voltage is applied between the electrodes, the liquid crystal molecules adjacent the patterned electrodes align substantially perpendicularly to the plane of the liquid crystal layer so that these regions have substantially no retardation.

Where liquid crystal material is used to provide patterned retarders without requiring the switching ability, such as the patterned quarter-wave retarder 34 in FIG. 24, the liquid crystal material may be fixed during manufacture so as to avoid the need for applying an electric field across the liquid crystal material. For example, the liquid crystal material may comprise a polymerisable liquid crystal material such as a reactive mesogen made by Merck. Such materials may be polymerised during manufacture so as to reduce the sensitivity of the liquid crystal cell to humidity, temperature and mechanical damage.

Figure 27:
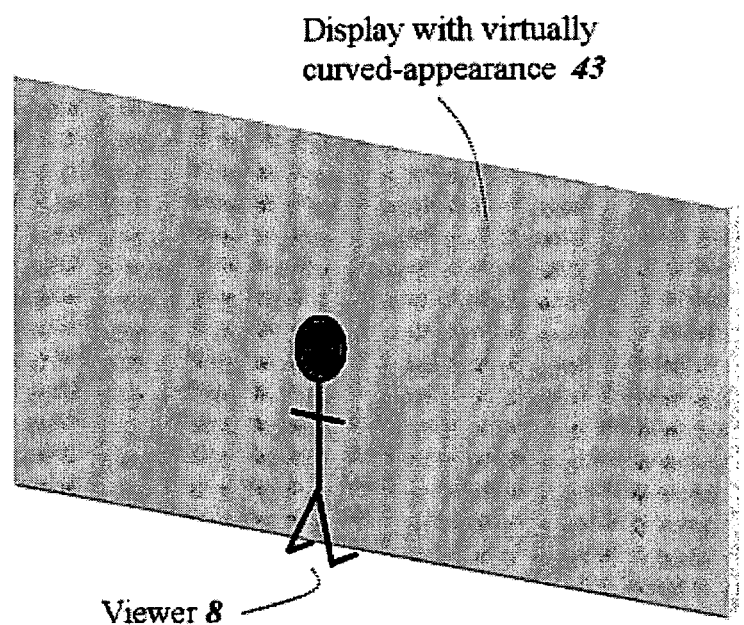
FIGS. 27a and 27b are diagrams illustrating a display constituting a tenth embodiment of the invention.
Figure 27:
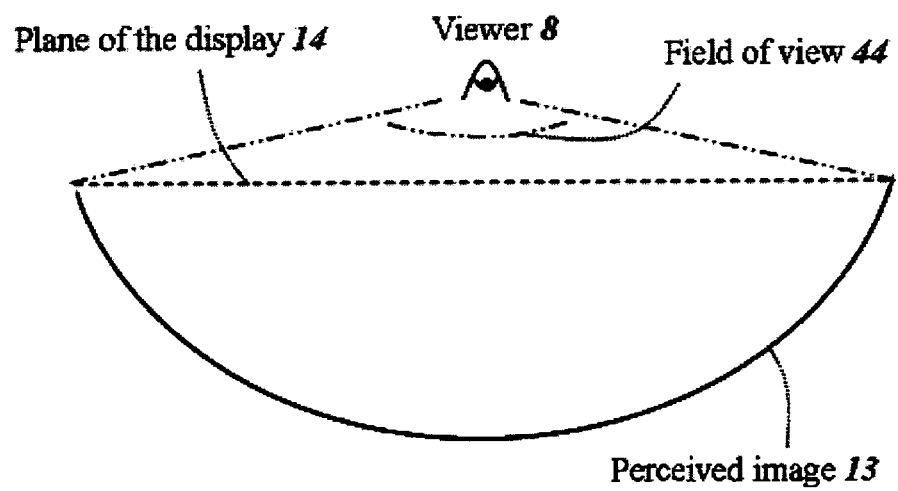

A tenth embodiment of the invention is illustrated in FIGS. 27a and 27b. This embodiment refers to another type of application for a curved-appearance display, which produces an immersive sensation to the viewer 8. For example, when the viewer 8 stands close enough to a large-area display 43 with virtually curved-appearance such that the displayed image is substantially covering the viewer's field of view 44, and when the curved-appearance display is designed to produce a perceived curved image 13 that appears to curve into the plane of the display 14 (as shown also in FIG. 12b), then the viewer 8 may feel a great sense of immersion when looking at the display 43.

In all of the embodiments described hereinbefore, some imaging issues may occur and disturb the appearance of the curved image produced by the display.

For example, a viewer 8 may move up and down while correctly perceiving the displayed images. However, it is possible that viewer movement from side to side results in imaging issues so that the curved appearance effect is compromised. Some light intended to follow the 'double reflection' path 6 may leak directly out of the optical system via the direct light path 7 and mix up the curved appearance of the displayed image. Such leakage results in imaging issues, called crosstalk, which should be reduced so as to be substantially imperceptible to the viewer 8. The main reason why such crosstalk is likely to happen is that polarisation-manipulating optical elements used in the system are generally not perfect, in particular not off-axis. For example, linear and reflective polarisers generally transmit some of the "wrong polarisation", retarders have behaviours which depend on orientation, wavelength and processing conditions and liquid crystal elements do not generally only transmit light with the correct polarisation state.

A possible method to correct for this type of crosstalk is by manipulating the original image data to the display. For example, if the percentage of light leaking through the direct light path 7 is small and known for each primary colour component, a correction function may be applied to the image data values such that the image formed in the plane not intended to be seen becomes faint and nearly imperceptible to the viewer 8. This correction function may be of either a linear type or a non-linear type according to the level of correction required. However, a downside of such crosstalk correction method is that the image quality of the display may deteriorate.

Figure 28:
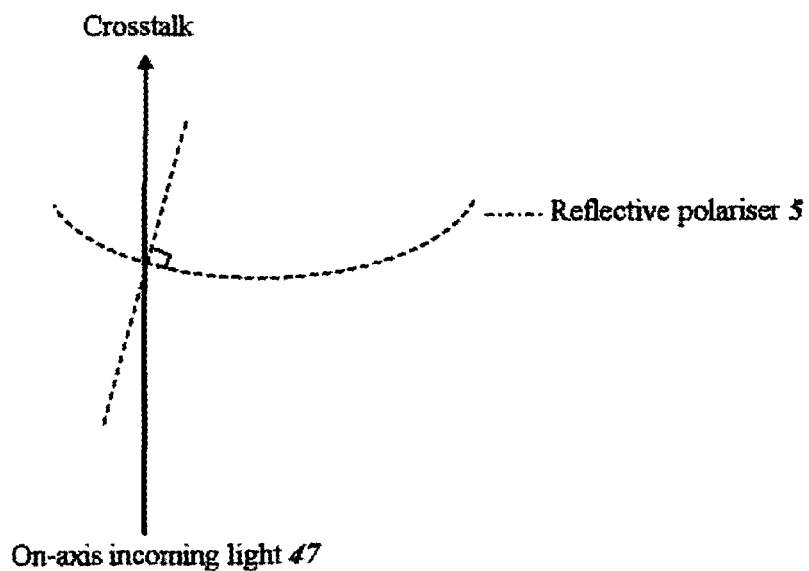
FIGS. 28a and 28b are diagrams illustrating a crosstalk mechanism and an arrangement for reducing such crosstalk.
Figure 28:
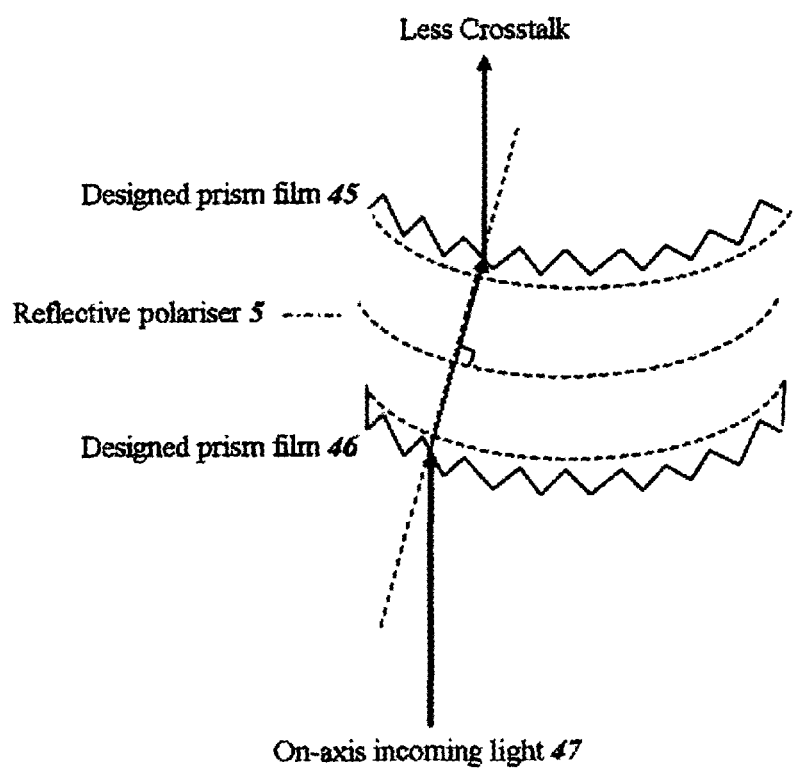

As previously mentioned, polarisation-manipulating optical elements, such as the reflective polariser 5, are not perfect and may show poor optical performance off-axis. When curved, even on-axis incoming light 47 may hit the reflective polariser 5 at an angle and therefore contribute to crosstalk as shown in FIG. 28*a*. As illustrated in FIG. 28*b* crosstalk resulting from this source may be reduced by using designed prism films 45 and 46 located on each side of the reflective polariser 5, which films modify the direction of light through the curved reflective polariser 5. These prism films may be designed with different or varying apex angles and may be metallised on one of their prismatic sides in order to improve light recycling and uniformity. The first prism film 45 is used to redirect on-axis incoming light 47 to be substantially, or nearer to, normal incidence on the reflective polariser 5 in the areas where it is curved and the second prism film 46 redirects light to exit the system with substantially the same direction as the incident light 47, i.e. on-axis. By adding these two optimised prism films 45 and 46, the reflective polariser 5 acts on on-axis light as if it was perfectly, or at least more, flat, so that imaging issues on-axis are reduced. The rest of the system works as described hereinbefore. An image with curved appearance is generated due to the double reflection of light within the system and the curved-shape given to at least one of the reflective layers.

Another example of an imaging issue which may occur with the virtually curved-appearance display technology is related to the curved-shape of the partial reflectors. As mentioned previously in the first embodiment, some curvature arrangements given to the reflective layers 3 and 5 may lead to magnification or de-magnification problems of the displayed image. Correction for this type of imaging issue is possible by hardware modification of the optical system, such as adding a lens system as shown in FIG. 13. However a simpler method may be based on software implementation.

Correction in an image processor controlled by software for image curvature or distortion may also be applied in a number of ways. Two examples follow.

In the first example, knowledge of the distortion is used to obtain a function which describes the image curvature, ideally parametrically in "x" and "y" coordinates on the output image surface. In order to avoid "holes" in the corrected image, i.e. pixels not mapped from the distorted original image, the process is applied to every pixel on the output. The function describing the distortion is used to provide the location on the source image to sample for each output pixel. This may involve sampling over a number of pixels in the neighborhood of the indicated source pixel in order to maintain image quality. The output image is then displayed as normal.

In the second example, knowledge of the distortion, or the surface causing it, is used to create a 3D object representing the distortion. Texture mapping in computer graphics hardware may be used to warp the input image onto the surface such that, when projected correctly on the display, the image appears to have no distortion. The warp may occur by projecting the source image, as if from the point of view of somebody observing the display, onto the surface representing the distortion.

Thus, image distortion by the or each non-flat one of the first and second reflectors 3, 5 may be at least partially corrected by remapping image pixels.

As a consequence of the fundamental way in which the display operates, the curved-appearance display described in most embodiments hereinbefore is subject to a brightness limitation. In theory, if the brightness of the electronic display 1 combined with the entrance linear polariser 9 is 100%, then the brightness of the device as described in the first embodiment is only 25% due to the partial reflectors. Modification of the original image by software may be of use in order to help to compensate for this brightness issue.

A possible method of helping to correct for this type of brightness issue is by manipulating the original image data supplied to the display. A correction function, of linear or non-linear type according to the level of correction desired, may be applied to image data values of at least part of the image or sequence of images. For example, an image processing technique which adjusts the gamma values in the original image may be used to increase the apparent brightness of the curved-appearance display. The gamma value describes the correspondence between the grey-level data in the image and the actual voltages applied to the display and hence the brightness that is ultimately displayed. Thus, for example by increasing the gamma values, the displayed brightness of the mid-grey levels may be increased whereas the fully black and/or fully white levels remain unchanged. The overall effect results in an increase in the apparent brightness of the image. However, a possible disadvantage of such an apparent brightness increase is that a large correction may result in a deterioration in the original image quality of the display.

Another solution to help to compensate for this brightness issue may be done by hardware. Because of potential imaging issues such as the ones described hereinbefore, horizontal and/or vertical viewing angles of the curved-appearance display may be reduced in comparison with a standard display. Brightness increase methods may therefore take advantage of these viewing angle limitations. For example, brightness increase may be achieved by introducing single brightness enhancing film (BEF) or crossed BEFs in the illumination system of the base panel display. Such BEFs are available from 3M. This will redirect a large part of the off-axis light towards the on-axis direction, reducing brightness in the unnecessary horizontal and/or vertical viewing windows and therefore making the overall display look brighter when seen on-axis but dimmer when seen off-axis. The rest of the display may be operated in any of the ways described hereinbefore, as with at least one of the reflective layers curved, and not necessarily towards the edge of the display, in order to generate the desired curved-appearance according to the application.

In the case of all embodiments of this invention, according to the application and in order to modify an existing flat panel display into a curved-appearance display, optical components constituting the optical system of the curved-appearance display may be fixed directly onto the base panel as part of its casing or may be arranged in a separate unit that acts as a removable attachment to the display. A removable attachment configuration presents many advantages, for instance its flexibility of use, its adaptability to different displays and the fact that it leaves the original base panel unmodified. However, in practice, one arrangement may be preferable to another according to the application.

A curved-appearance display may be advantageously combined with a touch panel in order to give added interactive functionality. This may use a touch panel of any type, for example resistive or capacitive type, mounted on the front of the display system. Alternatively, it may be preferable to use a projected-capacitive type touch panel. As this type of touch panel detects the proximity of a finger and does not require direct contact, it may, if required, be mounted beneath some of the optical films used in the curved-appearance system.

For a fuller understanding of the nature and advantages of the invention, reference should be made to the ensuing detailed description taken in conjunction with the accompanying drawings.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. An optical system for converting a flat image to a non-flat image, the optical system comprising first and second spaced-apart partial reflectors, at least one of which is non-flat, and providing a first light path for a first light incident on the first reflector, the first light path comprising at least partial transmission through the first reflector towards the second reflector, at least partial reflection from the second reflector towards the first reflector, at least partial reflection from the first reflector towards the second reflector, and at least partial transmission through the second reflector, the optical system being arranged substantially to prevent emission from the second reflector of the first light not reflected during reflection by the first and second reflectors, wherein light incident on the second partial reflector for the first time does not leave the optical system.

2. A system as claimed in claim 1, in which the optical system is arranged to change the polarisation of the first light during passage along the first path.

3. A system as claimed in claim 2, in which the optical system is arranged to change the polarisation of the first light during passage along the first path between incidence on the second reflector and reflection from the first reflector.

4. A system as claimed in claim 1, in which the optical system is switchable to a flat image mode to provide a second light path different from the first path.

5. A system as claimed in claim 4, in which the second light path comprises at least partial transmission through the first reflector towards the second reflector and at least partial transmission through the second reflector.

6. A system claimed in claim 5, in which the optical system is arranged substantially to prevent emission from the second reflector of a second light not transmitted by the second reflector in the flat image mode.

7. A system as claimed in any one of the preceding claims claim 1, including a lens arrangement for at least partially correcting for image distortion by the or each non-flat one of the first and second reflectors.

8. A system as claimed in claim 1, in which the at least one of the first and second reflectors is continuously curved in at least one direction for producing a concave or convex image.

9. A system as claimed in claim 1, in which the at least one of the first and second reflectors comprises a plurality of flat segments, adjacent ones of which abut each other along an edge and subtend an angle greater than 0° and less than 180°.

10. A system as claimed in claim 1, in which the at least one of the first and second reflectors has a serpentine cross-section.

11. A system as claimed in claim 1, in which both of the first and second reflectors are non-flat.

12. A system as claimed in claim 11, in which the first and second reflectors have mirror-image shapes.

13. A system as claimed in claim 1, comprising at least one quarter wave plate.

14. A system as claimed in claim 13, in which the quarter wave plate or a second of the quarter wave plates is disposed between the first and second reflectors.

15. A system as claimed in claim 13, in which the quarter wave plate or a first of the quarter wave plates is disposed on a side of the first reflector opposite the second reflector.

16. A system as claimed in claim 1, in which the first reflector comprises a first partial mirror.

17. A system as claimed in claim 16, in which the first partial mirror comprises a patterned mirror associated with an array of converging lenses.

18. A system as claimed in claim 1, in which the first reflector comprises a first reflective polariser.

19. A system as claimed in claim 1, in which the second reflector comprises a second reflective polariser.

20. A system as claimed in claim 19, in which the second reflective polariser comprises a cholesteric reflector.

21. A system as claimed in claim 20, in which the cholesteric reflector is disablable.

22. A system as claimed in claim 19, in which the second reflective polariser is non-flat and in which the system comprises a first prism arranged to redirect light from the first partial reflector to be incident substantially normally on the second reflective polariser.

23. A system as claimed in claim 22, comprising a second prism film arranged to redirect light from the second reflective polariser to the direction of light incident on the first prism film.

24. A system as claimed in claim 1, in which the second reflector comprises a second partial mirror.

25. A system as claimed in claim 1, comprising a half wave plate.

26. A system as claimed in claim 25, in which the half wave plate is disablable.

27. A system as claimed in claim 25, in which the half wave plate is a directional half wave plate.

28. A system as claimed in claim 1, comprising a Faraday rotator.

29. A system as claimed in claim 28, in which the Faraday rotator is arranged to provide 45° of polarisation rotation.

30. A system as claimed in claim 1, in which the at least one of the first and second reflectors is of controllable variable shape.

31. A system as claimed in claim 1, comprising an input linear polariser.

32. A system as claimed in claim 1, comprising an output linear polariser.

* * * * *